US008624880B2

(12) United States Patent
Ishiguro et al.

(10) Patent No.: US 8,624,880 B2
(45) Date of Patent: Jan. 7, 2014

(54) LIGHT EMITTING APPARATUS, METHOD OF DRIVING LIGHT EMITTING APPARATUS, AND ELECTRONIC APPARATUS

(75) Inventors: Hideto Ishiguro, Shiojiri (JP); Satoshi Yatabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 12/793,190

(22) Filed: Jun. 3, 2010

(65) Prior Publication Data

US 2010/0321422 A1 Dec. 23, 2010

(30) Foreign Application Priority Data

Jun. 18, 2009 (JP) ................................ 2009-145004

(51) Int. Cl.
*G06F 3/038* (2013.01)

(52) U.S. Cl.
USPC ........................................................ 345/204

(58) Field of Classification Search
USPC ............................................ 345/76–77, 204
See application file for complete search history.

(56) References Cited

U.S. PATENT DOCUMENTS

2007/0268210 A1 11/2007 Uchino et al.
2008/0001545 A1* 1/2008 Uchino et al. ................ 315/175
2008/0043005 A1* 2/2008 Kanda ........................... 345/204

FOREIGN PATENT DOCUMENTS

JP A-2007-310311 11/2007
JP A-2008-9198 1/2008

* cited by examiner

*Primary Examiner* — Waseem Moorad
(74) *Attorney, Agent, or Firm* — Oliff & Berridge, PLC

(57) ABSTRACT

Provided is a light emitting apparatus where each pixel circuit is provided with the reset transistor, which is disposed between the node of the pixel circuit and the first feed line corresponding to the adjacent pixel circuit in the second direction as viewed from the pixel circuit. In addition, in the initialization period before the selection period, in which the scan line corresponding to the pixel circuit is selected, and in the compensation period, the reset transistor of the pixel circuit is set to the ON state, and the values of the power supply voltages output to the first feed line corresponding to the pixel circuit and the first feed line corresponding to the adjacent pixel circuit in the second direction as viewed from the pixel circuit are variably controlled, so that the initialization or compensation operation of the pixel circuit is performed.

12 Claims, 15 Drawing Sheets

LIGHT EMITTING APPARATUS, METHOD OF DRIVING LIGHT EMITTING APPARATUS, AND ELECTRONIC APPARATUS

BACKGROUND

1. Technical Field

The present invention relates to a light emitting apparatus, a method of driving a light emitting apparatus, and an electronic apparatus.

2. Related Art

In a light emitting apparatus in which a driving transistor controls a driving current supplied to a light emitting device, there is a problem of errors in a characteristic of the driving transistor (difference from a target value or non-uniformity among pixels). JPA-2008-9198 and JP-A-2007-310311 discloses a technology for compensating for an error of a threshold voltage or a mobility of the driving transistor by setting a gate-source voltage of the driving transistor to a threshold voltage of the driving transistor and then changing to a voltage according to gradation.

FIG. 21 is a circuit diagram illustrating a configuration of a pixel circuit P0 disclosed in JP-A-2008-9198. In the initialization period, the transistors Tr2 and Tr3 are set to the ON state, so that the gate-source voltage of the driving transistor Tdr is initialized to |Vss1−Vss2|. In the compensation period, the transistor Tr3 is transitioned into the OFF state, and the transistor Tr4 is transitioned into the ON state, so that a current is flown from the power supply line to the driving transistor Tdr. Accordingly, the gate-source voltage of the driving transistor Tdr asymptotically approaches the threshold voltage VTH. In the writing period, the transistor Tr2 is transitioned into the OFF state, the transistor Tr1 is transitioned into the ON state, and the voltage of the data line S1 is set to a data voltage according to the designated gradation of the pixel circuit P0. Accordingly, the voltage of the gate of the driving transistor Tdr is set to a value according to the data voltage. Next, the current according to the data voltage is flown to the driving transistor Tdr, so that the voltage of the source thereof is increased. Accordingly, a mobility compensation operation through negative feedback is performed. In the light emitting period, the transistor Tr1 is transitioned into the OFF state, so that the gate of the driving transistor 3B is in an electrically floating state. At this time, the voltage across the capacitance device Cs is stored as the voltage of the end point of the writing period, and a current according to the voltage is flown to the driving transistor Tdr, so that the voltage of the source of the driving transistor Tdr is increased. Accordingly, the voltage of the gate of the driving transistor Tdr is increased in conjunction with the voltage of the source (bootstrap operation). In addition, if the voltage of the source exceeds a light emitting threshold value, an OLED device E is in a state where the device emits light.

However, in the technology disclosed in JPA-2008-9198, since a large number of signal lines and transistors are provided to perform an initialization or compensation operation, there is a problem in that the configuration is complicated. On the other hand, in JP-A-2007-310311, the data lines are also used as the signal lines for supplying signals used for the initialization or compensation operation, so that the number of the signal lines or the number of the transistors can be reduced in comparison with JP-A-2008-9198. FIG. 22 is a diagram illustrating a configuration of a pixel circuit P1 disclosed in JP-A-2007-310311. In JP-A-2007-310311, a time period (that is, one horizontal scan time period) in which a selection transistor 3A is set to an ON state is provided with an initialization period, a compensation period, and a writing period. In the initialization period, a voltage of the data line DTL101 is set to a reference voltage V0 and a voltage of the power supply line DSL101 is set to a voltage Vcc_L (<V0), so that a gate-source voltage of a driving transistor 3E is initialized. In the compensation period, the voltage of the data line DTL101 is maintained to the reference voltage V0 and the voltage of the power supply line DSL101 is set to a high voltage Vcc_H (>Vcc_L), so that the gate-source voltage of the driving transistor 3B is allowed to asymptotically approach a threshold voltage of the driving transistor 3B. In the writing period, the voltage of the power supply line DSL101 is maintained to the high voltage Vcc_H and the voltage of the data line DTL101 is set to a data voltage Vin according to the designated gradation of the pixel circuit P1, so that a current according to the data voltage Vin is flown to the driving transistor 3B, thereby compensating for the mobility. After the writing period, if the light emitting period starts, the selection transistor 3A is set to the OFF state, so that the source voltage of the driving transistor 3B is increased. If the source voltage exceeds the light emitting threshold value, an OLED device 3D is in the state where the OLED device 3D emits light.

However, in the technology disclosed in JPA-2007-310311, in the time period (one horizontal scan time period) in which the selection transistor 3A is set to the ON state, since the reference voltage V0 and the data voltage Vin are configured to be time-divisionally supplied to the data line DTL101, there is s a problem in that it is difficult to secure a sufficient time period for writing the data voltage in the one horizontal scan time period.

SUMMARY

An advantage of some aspects of the invention is to simplify a configuration for performing the initialization or compensation operation and to secure a sufficient time period for writing a data voltage.

According to an aspect of the invention, there is provided a light emitting apparatus including: a plurality of scan lines, each of which is configured to extend in a first direction; a plurality of first feed lines which is disposed in one-to-one correspondence with the plurality of the scan lines; a plurality of data lines, each of which is configured to extend in a second direction different from the first direction; a plurality of pixel circuits which are disposed corresponding to intersections of the plurality of the scan lines and the plurality of the data lines; and a driving circuit (for example, including a first driving circuit 32, a second driving circuit 34, and a data line driving circuit 36 shown in FIG. 1) which drives the pixel circuits, wherein each of the plurality of the pixel circuits includes: a driving transistor and a light emitting device which are disposed in series between the first feed line corresponding to the pixel circuit and a second feed line; a capacitance device which is disposed between a gate and a source of the driving transistor; a selection transistor which is disposed between the gate of the driving transistor and the data line corresponding to the pixel circuit; and a reset transistor which is disposed between a node interposed between the gate of the driving transistor and the selection transistor and the first feed line corresponding to an adjacent pixel circuit in the second direction (for example, to the negative side of the Y direction shown in FIG. 3) as viewed from the pixel circuit, wherein in each selection period (each horizontal scan time period H shown in FIG. 2), the driving circuit sequentially selects one scan line and outputs a data voltage according to a designated gradation of the pixel circuit corresponding to the one scan line to each data line, wherein in an initialization period before the selection period, the driving circuit sets the selection transistor of the pixel circuit corresponding to the scan line, which is to be selected in the selection period, to an OFF state and sets the reset transistor to an ON state, and the driving circuit sets a voltage output to the first feed line corresponding to the pixel circuit to a first voltage and sets a voltage output to the first feed line corresponding to the adjacent pixel circuit in the second direction as viewed from the pixel circuit to a second voltage so that the driving transistor is in the ON state, wherein in a compensation period after the initialization period and before the selection period, the driving circuit performs a compensation operation of allowing a gate-source voltage of the driving transistor to asymptotically approach a threshold voltage by setting a voltage output to the first feed line corresponding to the scan line, which is to be selected in the selection period, to the second voltage, so that a current is flown from the first feed line to the driving transistor; wherein in the selection period, the driving circuit sets the selection transistor of the pixel circuit corresponding to the scan line, which is to be selected in the selection period, to the ON state and sets the reset transistor to the OFF state, and the driving circuit sets the voltage output to the first feed line corresponding to the pixel circuit to a third voltage so as for the current according to the data voltage to be flown to the driving transistor, so that a voltage across the capacitance device is set to a value reflecting the data voltage and a characteristic (for example, a threshold voltage VTH or a mobility μ of the driving transistor) of the driving transistor, and wherein in a light emitting period after the selection period, the driving circuit sets the selection transistor of the pixel circuit corresponding to the scan line selected in the selection period to the OFF state, so that the source voltage of the driving transistor (a voltage of a connection point between the driving transistor and the light emitting device) is changed so that the light emitting device emits light.

For example, in the case where the driving transistor is an N channel type transistor, the driving circuit allows the light emitting device to emit light by increasing the source voltage of the driving transistor by setting the selection transistor to the OFF state in the light emitting period. In this case, the heights of the first, second, and third voltages satisfy the relationship, first voltage<second voltage<third voltage. On the other hand, in the case where the driving transistor is a P channel type transistor, the relationship of the voltages (the heights of the voltages) is inverted in comparison with the case where the N channel type driving transistor is employed.

In the invention, each pixel circuit is provided with the reset transistor, which is disposed between the node of the pixel circuit and the first feed line corresponding to the adjacent pixel circuit in the second direction as viewed from the pixel circuit. In addition, in the initialization period before the selection period, in which the scan line corresponding to the pixel circuit is selected, and in the compensation period, the reset transistor of the pixel circuit is set to the ON state, and the values of the power supply voltages output to the first feed line corresponding to the pixel circuit and the first feed line corresponding to the adjacent pixel circuit in the second direction as viewed from the pixel circuit are variably controlled, so that the initialization or compensation operation of the pixel circuit is performed. In other words, in the invention, since the initialization or compensation operation of the pixel circuit corresponding to the one scan line is performed before the start of the one horizontal scan time period in which the one scan line is selected, unlike the configuration shown in FIG. 22, a time period of performing the initialization or compensation operation of the pixel circuit is not necessarily provided to the one horizontal scan time period. Therefore, it is possible to secure a sufficient time period for writing the data voltage in the one horizontal scan time period in comparison with the configuration shown in FIG. 22.

In addition, since the first feed line corresponding to the adjacent row as viewed from the pixel circuit is also used as the signal line for supplying signals used for the initialization or compensation operation of each of the pixel circuits, the number of signal lines or the number of transistors can be reduced in comparison with the embodiment (for example, the embodiment shown in FIG. 21) where the signal lines for supplying the signals used for the initialization or compensation operation are separately provided.

In other words, according to the invention, there is an advantage in that it is possible to simplify the configuration for performing the initialization or compensation operation and to secure a sufficient time period for writing the data voltage.

In the light emitting apparatus according to the above aspect of the invention, the first, second, and third voltages may be set so that the light emitting device does not emit light in the initialization period, the compensation period, and the selection period. If the light emitting device emits light in a time period (for example, a time period corresponding to the initialization period or the compensation period) before the start of the light emitting period, there is a problem in that a contrast of a displayed image deteriorates. According to the aspect, the light emitting device can be securely maintained in the off state (light non-emitting state) in a time period before the start of the light emitting period. Therefore, there is an advantage in that it is possible to suppress the deterioration in the contrast of the displayed image.

In the light emitting apparatus according to the above aspect of the invention, the driving circuit may change the data voltage as time elapses so that a time rate of change of the data voltage at a time of stop of the supply of the data voltage to the driving transistor of the pixel circuit corresponding to the scan line, which is to be selected, is a time rate of change corresponding to the designated gradation of the pixel circuit.

According to the aspect, if the data voltage is supplied to the gate of the driving transistor, a current according to the time rate of change of the data voltage (a current independent of a threshold voltage or a mobility of the driving transistor) is flown to the driving transistor. The voltage across the capacitance device is set to a voltage so that a current according to the time rate of change of the data voltage at the time of stop of the supply of the data voltage to the driving transistor is flown to the driving transistor. More specifically, the voltage across the capacitance device may be set so that a current corresponding to a product of the time rate of change of the data voltage at the time of stop of the supply of the data voltage to the driving transistor and a capacitance value of a capacitance accompanied with the light emitting device is flown to the driving transistor. The time rate of change at the time of stop of the supply of the data voltage is variably set according to the designated gradation of the pixel circuit. Therefore, the driving current supplied to the light emitting device according to the voltage across the capacitance device is set to a current amount according to the designated gradation (a current amount independent of the threshold voltage or the mobility of the driving transistor). In addition, the time rate of change of a voltage denotes a rate of change in the voltage as time elapses and is the same as a gradient of the voltage with respect to the time axis or a time differential value of the voltage.

In the light emitting apparatus according to the above aspect of the invention, the plurality of the data lines may be grouped into a plurality of blocks in units of a plurality of lines, wherein the light emitting apparatus further includes: a plurality of image signal lines which are disposed in one-to-one correspondence with the plurality of the blocks; and a plurality of selection units which are disposed in one-to-one correspondence with the plurality of the blocks to switch conduction and non-conduction between the data lines included in the corresponding block and the image signal lines corresponding to the block, wherein in a first time period of each selection period, the driving circuit (for example, a data line driving circuit 36 shown in FIG. 15) time-divisionally outputs to the image signal lines the data voltages according to the designated gradations of the pixel circuits corresponding to the intersections of the data lines included in the block corresponding to the image signal lines and the scan line which is to be selected in the selection period, and each of the plurality of the selection units time-divisionally selects the data lines included in the block corresponding to the selection unit and allows the data line to be conducted to the image signal line corresponding to the block, and wherein in a second time period after the first time period of each selection period, the driving circuit (for example, a first driving circuit 32 shown in FIG. 15) sets the selection transistor of the pixel circuit corresponding to the scan line, which is to be selected in the selection period, to the ON state.

In the above aspect, a demultiplexer method in which the data voltages time-divisionally supplied to each of the image signal lines are distributed to the data lines included in the block corresponding to the image signal line by the selection unit corresponding to the image signal line is employed. Therefore, the total number of the image signal lines that are the output wire lines of the driving circuit may be smaller than the total number of the data lines. In other words, there is an advantage in that the number of the output wire lines of the driving circuit can be reduced.

The light emitting apparatus according to the invention may be adapted to various types of electronic apparatuses. Typical examples of the electronic apparatus are apparatus using the light emitting apparatus as a display apparatus. As an example of the electronic apparatus according to the invention, there is a personal computer or a mobile phone.

According to another aspect of the invention, there is provided a method of driving a light emitting apparatus. As a method of driving a light emitting apparatus including: a plurality of scan lines, each of which is configured to extend in a first direction; a plurality of first feed lines which is disposed in one-to-one correspondence with the plurality of the scan lines; a plurality of data lines, each of which is configured to extend in a second direction different from the first direction; and a plurality of pixel circuits which are disposed corresponding to intersections of the plurality of the scan lines and the plurality of the data lines, each of the plurality of the pixel circuits including a driving transistor and a light emitting device which are disposed in series between the first feed line corresponding to the pixel circuit and a second feed line and a capacitance device which is disposed between a gate and a source of the driving transistor, the method includes: in each selection period, sequentially selecting one scan lines and outputting a data voltage according to a designated gradation of the pixel circuit corresponding to the one scan line to each data line; in an initialization period before the selection period, setting a voltage output to the first feed line corresponding to the pixel circuit to a first voltage and setting a voltage output to the first feed line corresponding to the adjacent pixel circuit in the second direction as viewed from the pixel circuit to a second voltage so that the driving transistor of the pixel circuit, which is to be selected in the selection period, is in the ON state; in a compensation period after the initialization period and before the selection period, performing a compensation operation of allowing a gate-source voltage of the driving transistor to asymptotically approach a threshold voltage by setting a voltage output to the first feed line corresponding to the pixel circuit, which is to be selected in the selection period, to the second voltage, so that a current is flown from the first feed line to the driving transistor; in the selection period, supplying the data voltage according to a designated gradation of the pixel circuit, which is to be selected in the selection period, to the gate of the driving transistor of the pixel circuit, and setting the voltage output to the first feed line corresponding to the pixel circuit to a third voltage so that a current according to the data voltage is flown to the driving transistor, so that a voltage across the capacitance device is set to a value reflecting the data voltage and a characteristic of the driving transistor; and in a light emitting period after the selection period, changing the source voltage of the driving transistor so that the light emitting device emits light. According to the above driving method, it is possible to obtain the same advantages as those of the light emitting apparatus according to the invention.

In the method of driving a light emitting apparatus according to the above embodiment of the invention, the data voltage may be allowed to be changed as time elapses so that a time rate of change of the data voltage at a time of stop of the supply of the data voltage to the driving transistor of the pixel circuit corresponding to the scan line, which is to be selected, is a time rate of change corresponding to the designated gradation of the pixel circuit.

BRIEF DESCRIPTION OF THE DRAWINGS

The invention will be described with reference to the accompanying drawings, wherein like numbers reference like elements.

DESCRIPTION OF EXEMPLARY EMBODIMENTS

A: First Embodiment

A-1: Configuration and Operations of Light Emitting Apparatus

Figure 1:
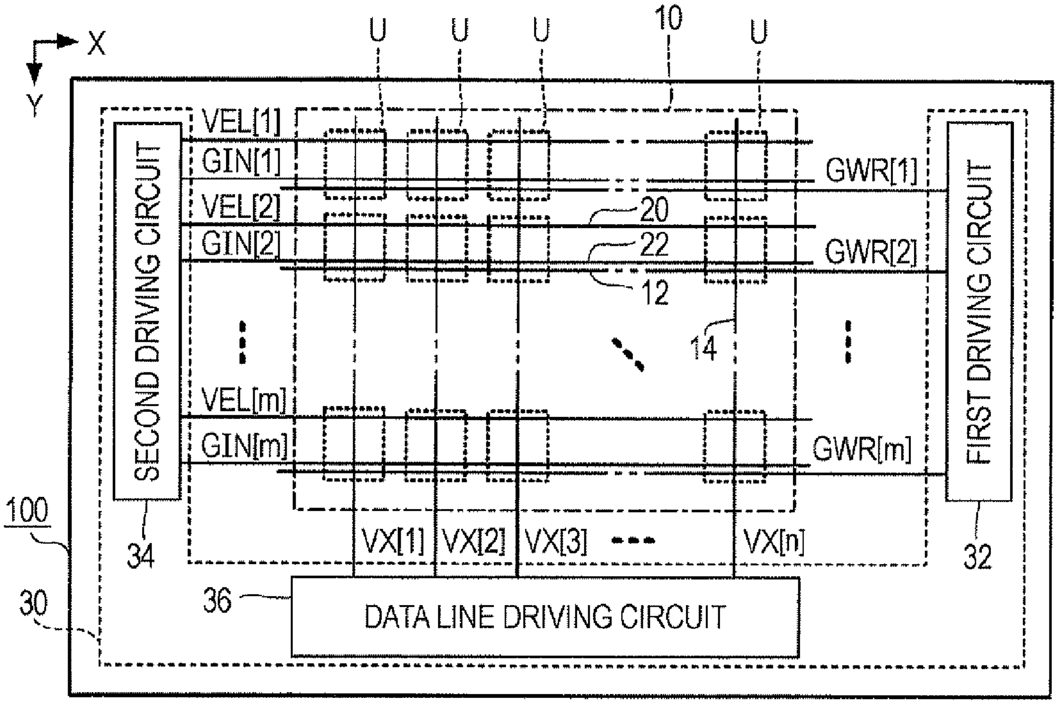
FIG. 1 is a block diagram illustrating a light emitting apparatus according to a first embodiment.

FIG. 1 is a block diagram illustrating a light emitting apparatus 100 according to a first embodiment of the invention. The light emitting apparatus 100 is a display apparatus of displaying an image, which is mounted on an electronic apparatus. As shown in FIG. 1, the light emitting apparatus 100 includes a device unit 10 where a plurality of pixel circuits U are disposed and a driving circuit 30 which drives the pixel circuits U. The driving circuit 30 includes a first driving circuit 32, a second driving circuit 34, and a data line driving circuit 36. The driving circuit 30 is distributively mounted on, for example, a plurality of integrated circuits. At least a portion of the driving circuit 30 may be configured with thin film transistors which are formed together with the pixel circuits U on a substrate.

In the device unit 10, m scan lines 12 extending in the X direction, m first feed lines 20 and m control lines 22 extending in the X direction as pairs of the scan lines 102, and n signal lines 14 extending in the Y direction intersecting the X direction are formed (m and n are natural numbers). A plurality of the pixel circuits U are disposed at the intersections of the scan lines 12 and the signal lines 14, so that the pixel circuits U are disposed in a shape of an m (vertical)×n (horizontal) matrix.

Figure 2:
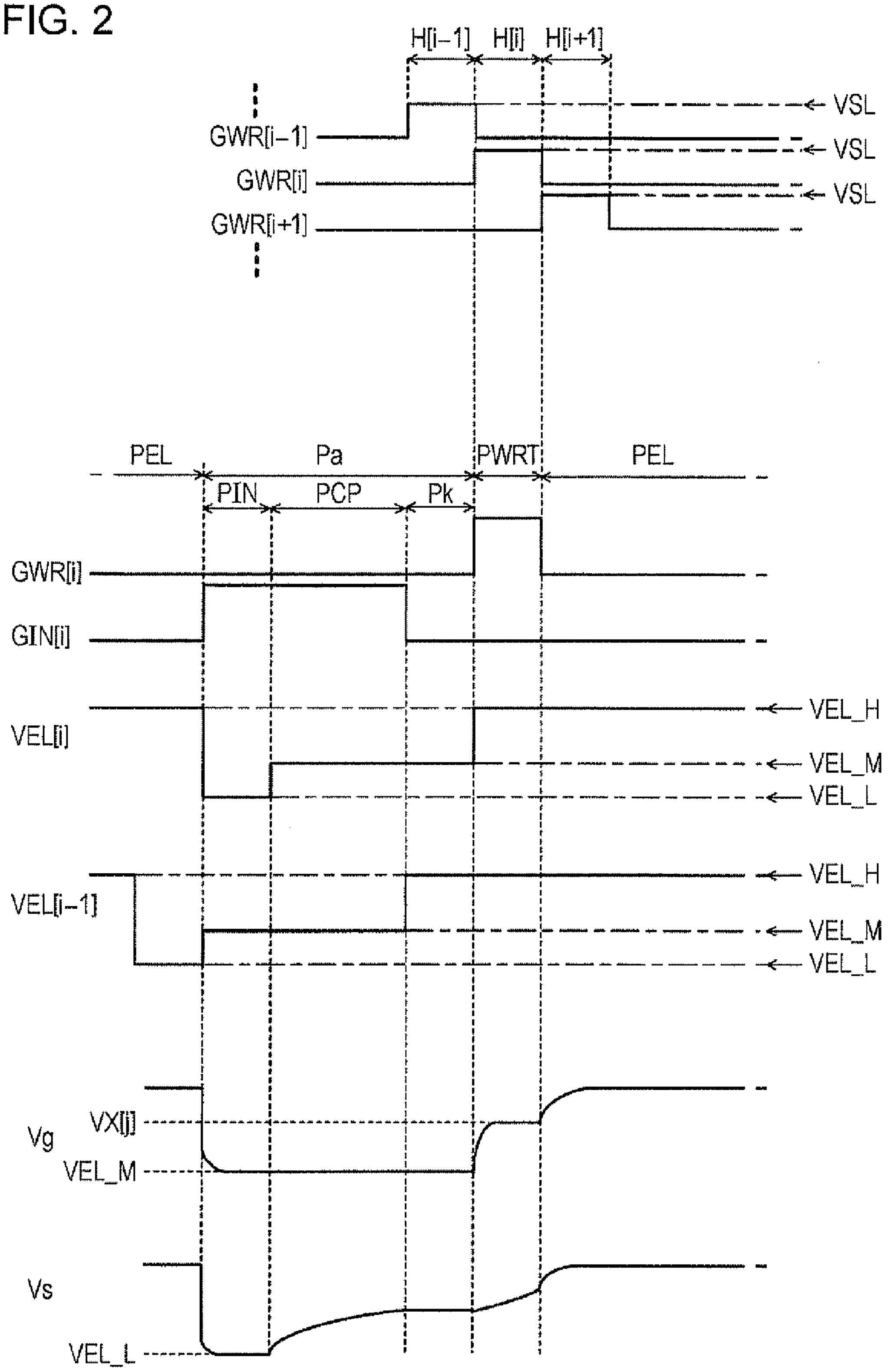
FIG. 2 is a timing chart illustrating operations of the light emitting apparatus.

The first driving circuit (scan line driving circuit) 32 is a circuit of sequentially selecting the plurality of the pixel circuits U in units of a row. As shown in FIG. 2, the first driving circuit 32 sequentially sets scanning signals GWR[1] to GWR [m] in m horizontal scan time periods H (H[1] to H[m]) of the vertical scanning time period to active levels (high levels), so that the scan lines 12 (a set of the n pixel circuits U of each row) is sequentially selected. Although omitted in the above description, the first driving circuit 32 includes shift registers. In the embodiment, the time period in which each of the scanning signal GWR[1] to GWR[m] is at high levels is denoted by a “writing period PWRT”.

The second driving circuit 34 generates power supply voltages VEL[1] to VEL[m] and outputs the power supply voltages to first feed lines 20. In addition, the second driving circuit 34 generates control signals GIN[1] to GIN[m] and outputs the control signals to the control lines 22.

The data line driving circuit 36 generates data voltages VX[1] to VX[n] corresponding to (n) pixel circuits U of one row selected by the first driving circuit 32 in each writing period PWRT and outputs the data voltages to the data lines 14. In the writing period PWRT where the i-th row (i is an integer satisfying 1≤i≤m) is selected, the data voltage VX[j] output to the j-th data line 14 (j is an integer satisfying 1≤j≤n) is set to a voltage corresponding to the designated gradation of the j-th pixel circuit U of the i-th row.

Figure 3:
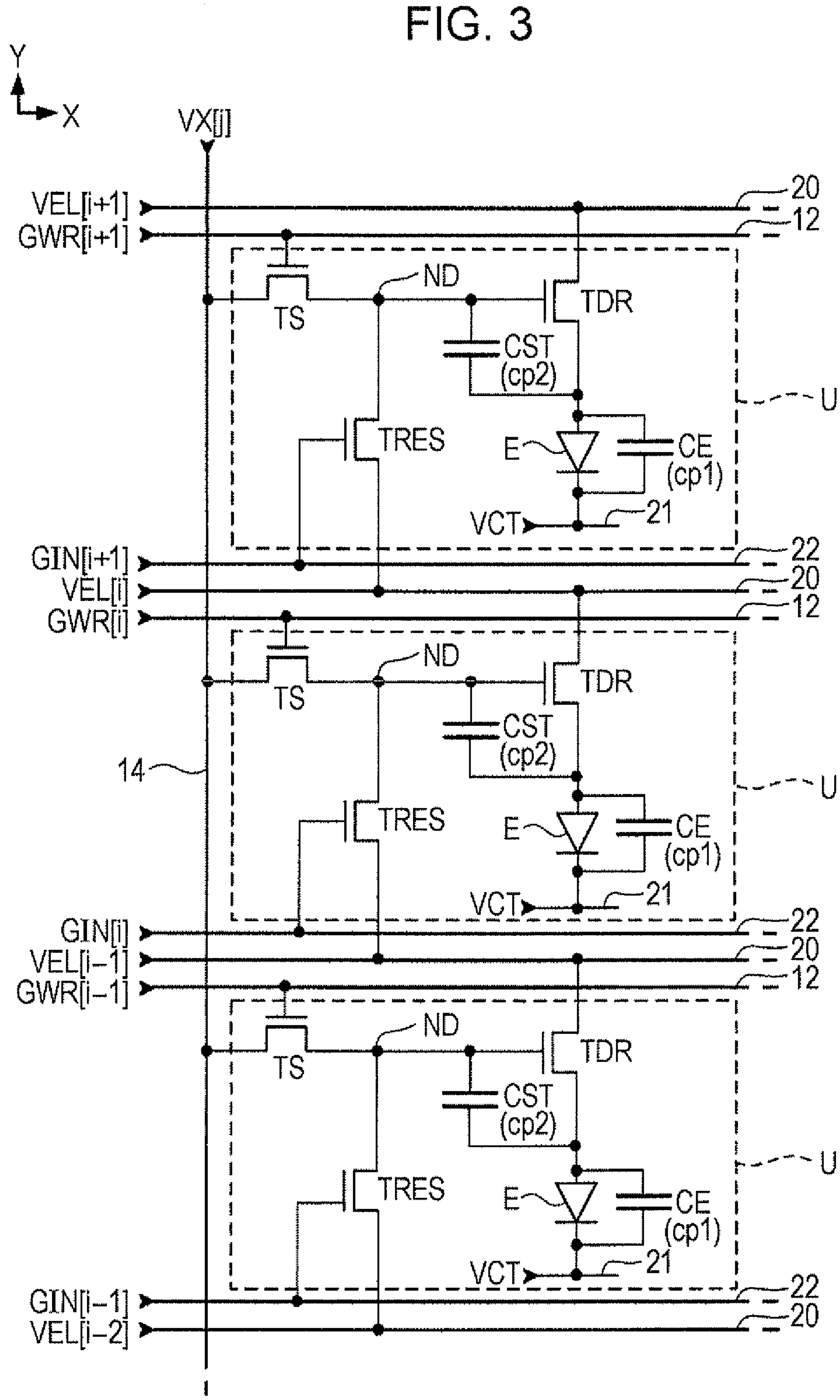
FIG. 3 is a circuit diagram illustrating pixel circuits.

FIG. 3 is a circuit diagram illustrating pixel circuits U. In FIG. 3, a plurality of the pixel circuits U disposed corresponding to intersections of a j-th data line 14 and scan lines 12 of a plurality of rows are exemplarily illustrated. In FIG. 3, the pixel circuit U of the (i−1)-th row, the pixel circuit U of the i-th row, and the pixel circuit U of the (i+1)-th row are representatively illustrated. Hereinafter, the configuration of the pixel circuit U of the i-th row is exemplarily described.

As shown in FIG. 3, the pixel circuit U includes a light emitting device E, a driving transistor TDR, a selection transistor TS, a reset transistor TRES, and a capacitance device CST (capacitance value cp2). The driving transistor TDR and the light emitting device E are disposed in series in a path connecting the first feed line 20 and the second feed line 21, to which the low-level voltage VCT is supplied. The light emitting device E is an organic EL (electroluminescence) device, where a light emitting layer made of an organic EL material is interposed between the facing positive and negative electrodes. As shown in FIG. 3, the light emitting device E is accompanied with a capacitance CE (capacitance value cp1).

The driving transistor TDR is an N channel type transistor (for example, a thin-film transistor) of which the drain is connected to the first feed line 20 and of which the source is connected to the positive electrode of the light emitting device E. The capacitance device CST is interposed between the source of the driving transistor TDR (that is, the path between the driving transistor TDR and the light emitting device E) and the gate of the driving transistor TDR.

The selection transistor TS is an N channel type transistor disposed between the data line 14 and the gate of the driving transistor TDR. The gate of the selection transistor TS is connected to the scan line 12.

The reset transistor TRES is an N channel type transistor disposed between a node ND, which is interposed between the gate of the driving transistor TDR and the selection transistor TS, and the first feed line 20 (first feed line 20 of the (i−1)-th row) corresponding to the adjacent pixel circuit U of the (i−1)-th row in the negative side in the Y direction as viewed from the pixel circuit U. The gate of the reset transistor TRES is connected to the control line 22.

Next, signals used in the light emitting apparatus 100 are described with reference to FIG. 2. As shown in FIG. 2, the control signal GIN[i] is a signal which is set to an active level (high level) in some time period within the time period (hereinafter, referred to as a “operation period”) Pa just before the writing period PWPT where the scanning signal GWR(i) is set to the high level and which is set to an non-active level (low level) in the other time periods. As shown in FIG. 2, the operation period Pa is divided into an initialization period PIN, a compensation period PCP just after the initialization period, and a storing period Pk just after the compensation period PCP. The initialization period PIN is a period when the gate-source voltage of the driving transistor TDR is initialized. The compensation period PCP is a period when the gate-source voltage of the driving transistor TDR asymptotically approaches the threshold voltage VTH of the driving transistor TDR. The storing period Pk is a period when the gate-source voltage of the driving transistor TDR is sustained at a voltage of the end point of the compensation period PCP.

The control signal GIN[i] is set to the high level in the initialization period PIN and the compensation period PCP of the operation period Pa.

As shown in FIG. 2, the power supply voltage VEL[i] which is supplied to the first feed line 20 (that is, the first feed line 20 of the i-th row) corresponding to the i-th pixel circuit U is set to the first voltage VEL_L in the initialization period PIN and to the second voltage VEL_M (>VEL_L) in the compensation period PCP and the storing period Pk. Next, the power supply voltage VEL[i] is set to the third voltage VEL_H (>VEL_M) in a time period PEL (hereinafter, referred to as a "light emitting period") from the end point of the writing period PWR[i] to the start point of the operation period Pa where the control signal GIN[i] is at the high level. In addition, as shown in FIG. 2, if the aforementioned initialization period PIN starts, the power supply voltage VEL[i−1] which is supplied to the first feed line 20 (that is, the first feed line 20 of the (i−1)-th row) corresponding to the (i−1)-th pixel circuit U is transitioned from the first voltage VEL_L into the second voltage VEL_M, so that the power supply voltage VEL[i−1] is set so as to be maintained at the second voltage VEL_M in the initialization period PIN and the compensation period PCP. In the embodiment, the power supply voltages VEL[1] to VEL[m] have the same waveform, but they are shifted from each other only by a predetermined time length so that the aforementioned relationships are satisfied in the operation period Pa of each row.

Next, detailed operations (driving method) of the pixel circuit U are described. Hereinafter, the operations of the j-th pixel circuit U of the i-th row are described separately in the initialization period PIN, the compensation period PCP, the storing period Pk, the writing period PWRT, and the light emitting period PEL. The operations of the other pixel circuits U may be similarly described.

a. Initialization Period PIN

Figure 4:
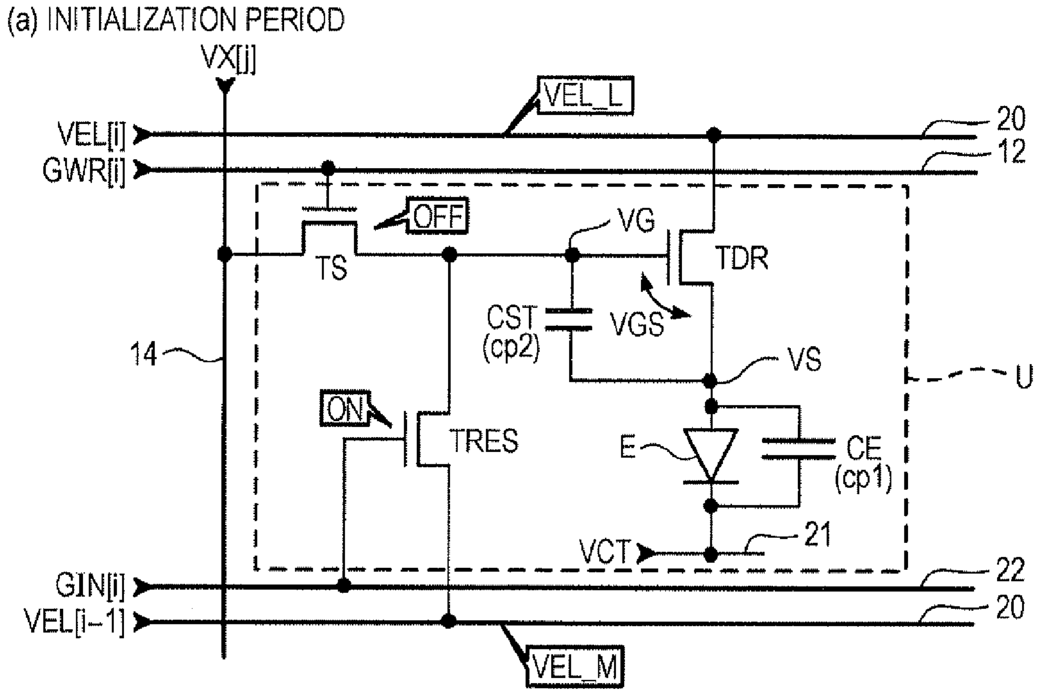
FIG. 4 is a diagram illustrating operations of the pixel circuit in an initialization period.

As shown in FIG. 2, the first driving circuit 32 sets the scanning signal GWR[i] to the low level. In addition, the second driving circuit 34 sets the control signal GIN[i] to the high level, and the second driving circuit 34 sets the power supply voltage VEL[i], which is output to the first feed line 20 of the i-th row, to the first voltage VEL_L and the power supply voltage VEL[i−1], which is output to the first feed line 20 of the (i−1)-th row, to the second voltage VEL_M. Therefore, as shown in FIG. 4, the selection transistor TS is in the OFF state, and the reset transistor TRES is in the ON state.

Since the gate of the driving transistor TDR is electrically conducted to the first feed line 20 of the (i−1)-th row through the reset transistor TRES, the gate voltage VG of the driving transistor TDR is set to the second voltage VEL_M. In the embodiment, since the differential voltage between the first voltage VEL_L (<VEL_M) and the second voltage VEL_M is set so as to be sufficiently higher than the threshold voltage VTH of the driving transistor TDR, the driving transistor TDR is in the ON state. Therefore, the source voltage VS of the driving transistor TDR is set to the first voltage VEL_L. In other words, the gate-source voltage VGS of the driving transistor TDR (voltage across the capacitance device CST) is initialized to the differential voltage (|VEL_L−VEL_M|) between the first voltage VEL_L and the second voltage VEL_M.

In addition, the first voltage VEL_L is set to a value so that the voltage difference (that is, the voltage across the capacitance CE) between the first voltage VEL_L and the low-level voltage VCT supplied to the second feed line 21 is sufficiently lower than the light emitting threshold voltage VTH_OLED of the light emitting device E. Therefore, in the initialization period PRS, the driving transistor TDR is in the ON state, so that the light emitting device E is in the OFF state (light non-emitting state).

b. Compensation Period PCP

Figure 5:
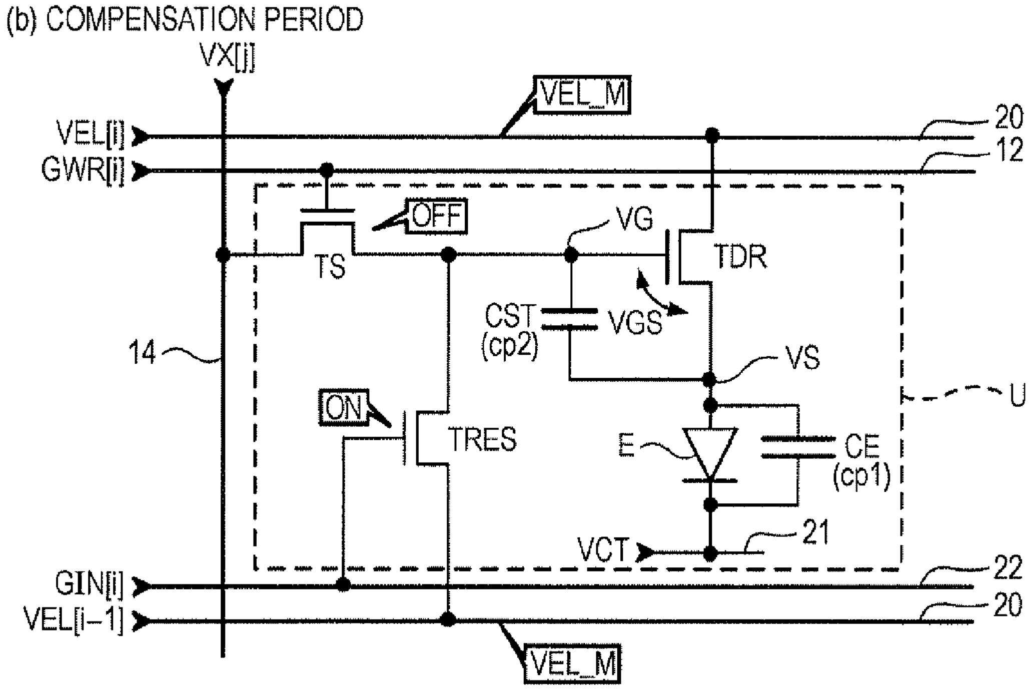
FIG. 5 is a diagram illustrating operations of the pixel circuit in a compensation period.

As shown in FIGS. 2 and 5, if the compensation period PCP starts, the second driving circuit 34 sets the power supply voltage VEL[i], which is output to the first feed line 20 of the i-th row, to the second voltage VEL_M. Accordingly, a current is flown from the first feed line 20 of the i-th row to the driving transistor TDR, so that an increase in the voltage VS of the source of the driving transistor TDR starts. At this time, since the gate voltage VG of the driving transistor TDR is maintained at the second voltage VEL_M, the gate-source voltage VGS of the driving transistor TDR is gradually decreased to asymptotically approach the threshold voltage VTH. In other words, in the compensation period PCP, a compensation operation of allowing the gate-source voltage VGS of the driving transistor TDR to asymptotically approach the threshold voltage VTH is performed.

At the end point of the compensation period PCP, since the gate-source voltage of the driving transistor TDR is substantially the same as the threshold voltage VTH of the driving transistor TDR, the source voltage VS of the driving transistor TDR is set to the voltage VEL_M-VTH, which is lower than the second voltage VEL_M (gate voltage VG) by the threshold voltage VTH. In the embodiment, the voltage VEL_M-VTH is set to a value so that the voltage across the capacitance CE is sufficiently lower than the light emitting threshold voltage VTH_OLED of the light emitting device E. Therefore, in the compensation period PCP, the driving transistor TDR and the light emitting device E are in the OFF state (light non-emitting state).

c. Storing Period Pk

Figure 6:
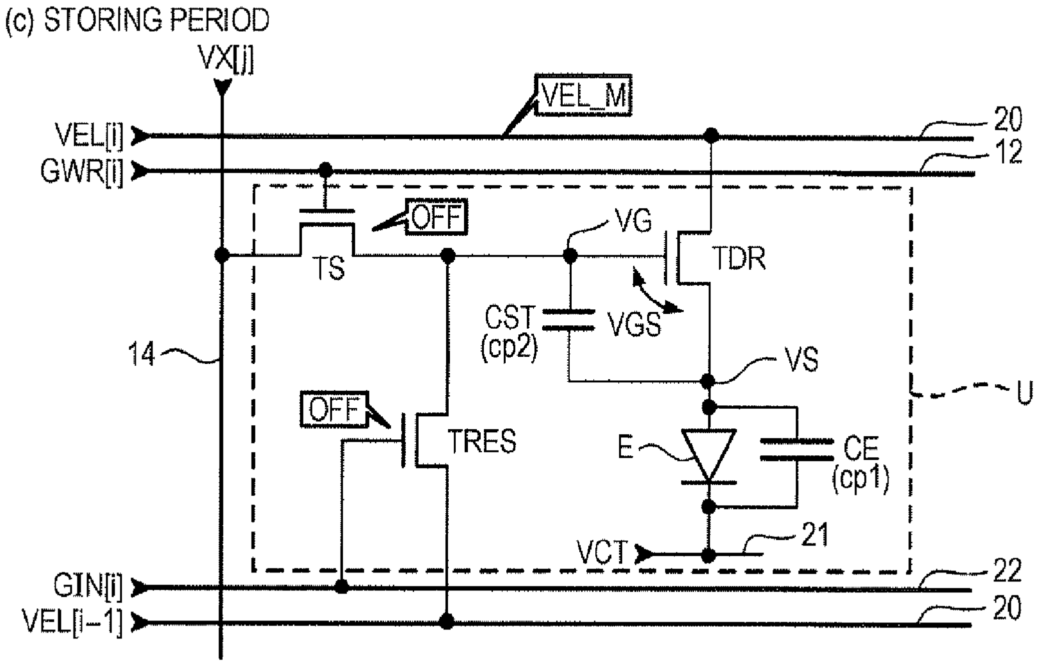
FIG. 6 is a diagram illustrating operations of the pixel circuit in a storing period.

As shown in FIG. 2, if the storing period Pk starts, the second driving circuit 34 sets the control signal GIN[i] to the low level. Therefore, as shown in FIG. 6, the reset transistor TRES is transitioned into the OFF state. Accordingly, the gate of the driving transistor TDR is in an electrically floating state. The voltage across the capacitance device CST (gate-source voltage VGS of the driving transistor TDR) is maintained at the voltage of the end point of the compensation period PCP.

d. Writing Period PWRT

Figure 7:
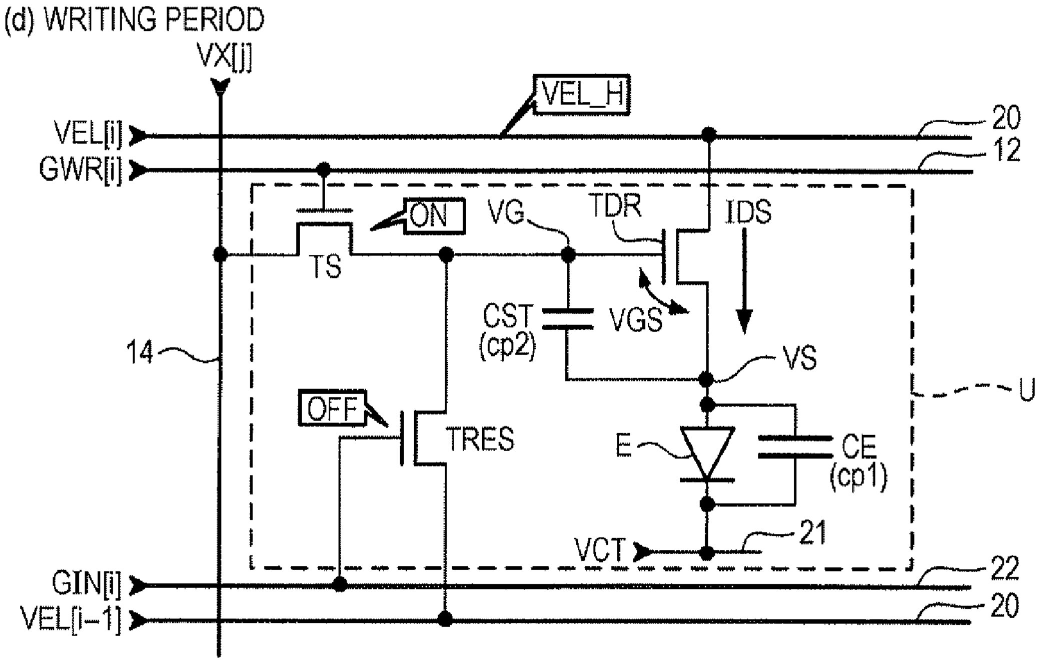
FIG. 7 is a diagram illustrating operations of the pixel circuit in a writing period.

As shown in FIG. 2, if the writing period PWRT starts, the first driving circuit 32 sets the scanning signal GWR[i] to the high level. Therefore, as shown in FIG. 7, since the selection transistor TS is transitioned into the ON state, the gate of the driving transistor TDR is electrically conducted to the data line 14. Accordingly, the data voltage VX[j] is supplied to the gate of the driving transistor TDR. In addition, at this time, the second driving circuit 34 sets the power supply voltage VEL [i], which is output to the first feed line 20 of the i-th row, to the third voltage VEL_H (>VEL_M) so that the current IDS according to the data voltage VX[j] is flown to the driving transistor TDR. By allowing the current IDS according to the data voltage VX[j] to be flown to the driving transistor TDR, the source voltage VS of the driving transistor TDR is increased as time elapses, so that the gate-source voltage VGS of the driving transistor TDR is decreased as time elapses.

Herein, as the mobility μ of the driving transistor TDR increase, the current IDS flown to the driving transistor TDR increases, so that the amount of increase of the source voltage VS is also large. On the contrary, as the mobility μ decreases, the current IDS flown to the driving transistor TDR decreases, so that the amount of increase of the source voltage VS is small in comparison with the case where the mobility μ is high. In other words, as the mobility μ increases, the amount of decrease (negative feedback amount) of the gate-source voltage VGS of the driving transistor TDR is large. In addition, as the mobility μ decreases, the amount of decrease (negative feedback amount) of the gate-source voltage VGS is small. Accordingly, the non-uniformity of the mobility μ at each pixel circuit U is compensated for. The mobility compensation operation is performed over the entire writing period PWRT, so that at the end point of the writing period PWRT, the voltage across the capacitance device CST is set to a value reflecting the characteristics (the threshold voltage VTH and the mobility μ) of the data voltage VX[j] and the driving transistor TDR.

In addition, the source voltage VS of the driving transistor TDR at the end point of the writing period PWRT is set to a value so that the voltage across the capacitance CE is sufficiently lower than the light emitting threshold voltage VTH_OLED of the light emitting device E. Therefore, in the writing period PWRT, the driving transistor TDR is in the ON state, so that the light emitting device E is in the OFF state (light non-emitting state).

e. Light Emitting Period PEL

Figure 8:
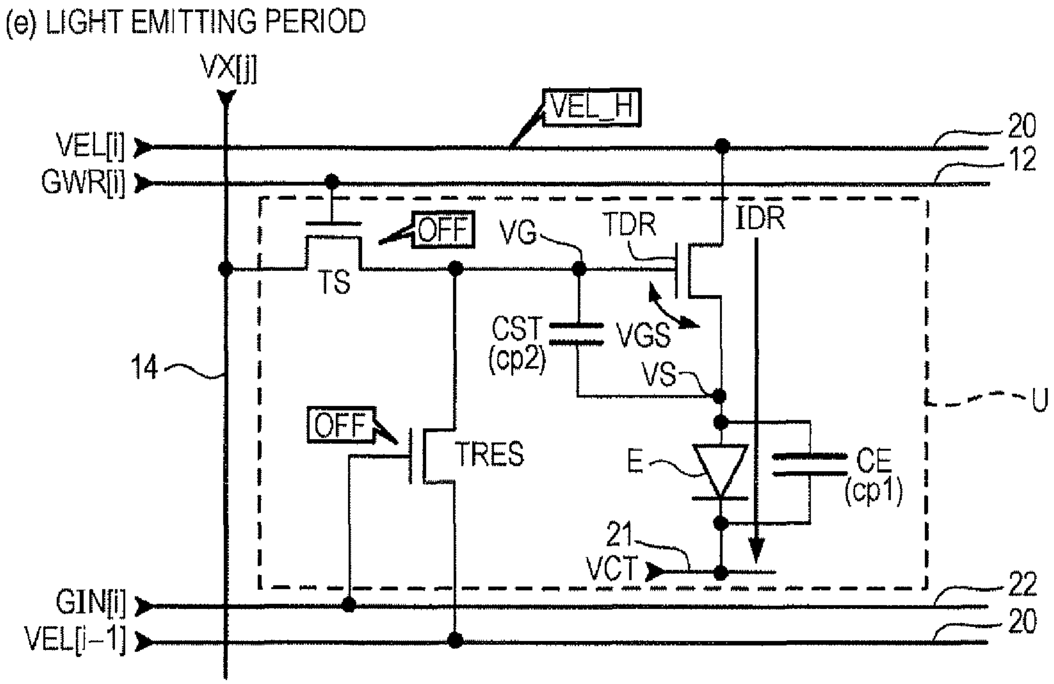
FIG. 8 is a diagram illustrating operations of the pixel circuit in a light emitting period.

As shown in FIG. 2, if the light emitting period PEL starts, the first driving circuit 32 sets the scanning signal GWR[i] to the low level. Therefore, as shown in FIG. 8, the selection transistor TS is transitioned into the OFF state, so that the gate of the driving transistor TDR is in an electrically floating state. At this time, since the voltage across the capacitance device CST (the gate-source voltage VGS of the driving transistor TDR) is maintained at the voltage of the end point of the writing period PWRT, the current IDS according to the voltage is flown to the driving transistor TDR, so that the source voltage VS is increased as time elapses.

At this time, since the gate of the driving transistor TDR is in the electrically floating state, the gate voltage VG of the driving transistor TDR is increased in conjunction with the source voltage VS. Therefore, in the state where the gate-source voltage VGS of the driving transistor TDR (the voltage across the capacitance device CST) is maintained at the voltage that is set at the end point of the writing period PWRT, the voltage across the capacitance CE accompanied with the light emitting device E (the source voltage VS of the driving transistor TDR) is gradually increased. If the voltage across the capacitance CE reaches the light emitting threshold voltage VTH_OLED of the light emitting device E, the current IDS as the driving current IDR is flown to the light emitting device E. The light emitting device E emits light with luminance according to the current amount of the driving current IDR.

Figure 22:
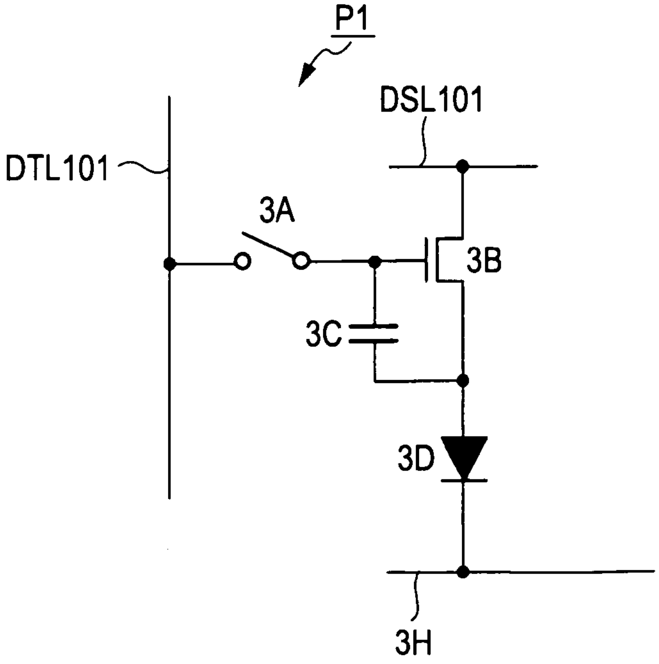
FIG. 22 Prior Art
FIG. 22 is a circuit diagram illustrating a pixel circuit in a light emitting apparatus in the related art.

As described above, in the embodiment, each pixel circuit U is provided with the reset transistor TRES disposed between the node ND of the pixel circuit U and the first feed line 20 corresponding to the adjacent pixel circuit U in the negative side in the Y direction as viewed from the pixel circuit U. In addition, in the initialization period PIN and the compensation period PCP before the horizontal scan time period H in which the pixel circuit U is selected, the reset transistor TRES of the pixel circuit U is set to the ON state, and the value of the power supply voltage VEL, which is output to the first feed line 20 of the pixel circuit U and the first feed line 20 corresponding to the adjacent pixel circuit U in the negative side in the Y direction as viewed from the pixel circuit U, is controlled to be varied, so that the initialization or compensation operation of the pixel circuit U is performed. In other words, in the embodiment, since the initialization or compensation operation of the pixel circuit U corresponding to the one scan line 12 is performed before the starting of the 1 horizontal scan time period H in which the one scan line 12 is selected, unlike the configuration of FIG. 22, any period for performing the initialization or compensation operation of the pixel circuit U is unnecessarily provided to the 1 horizontal scan time period H. Therefore, there is an advantage in that a sufficient time period for writing the data voltage VX within the 1 horizontal scan time period H can be secured in comparison with the configuration of FIG. 22. In the embodiment, the entire horizontal scan time period H is allocated to the period for writing the data voltage VX ((time length of the horizontal scan time period H)=(time length of the writing period PART)), so that a sufficient period for writing the data voltage VX can be secured.

Figure 21:
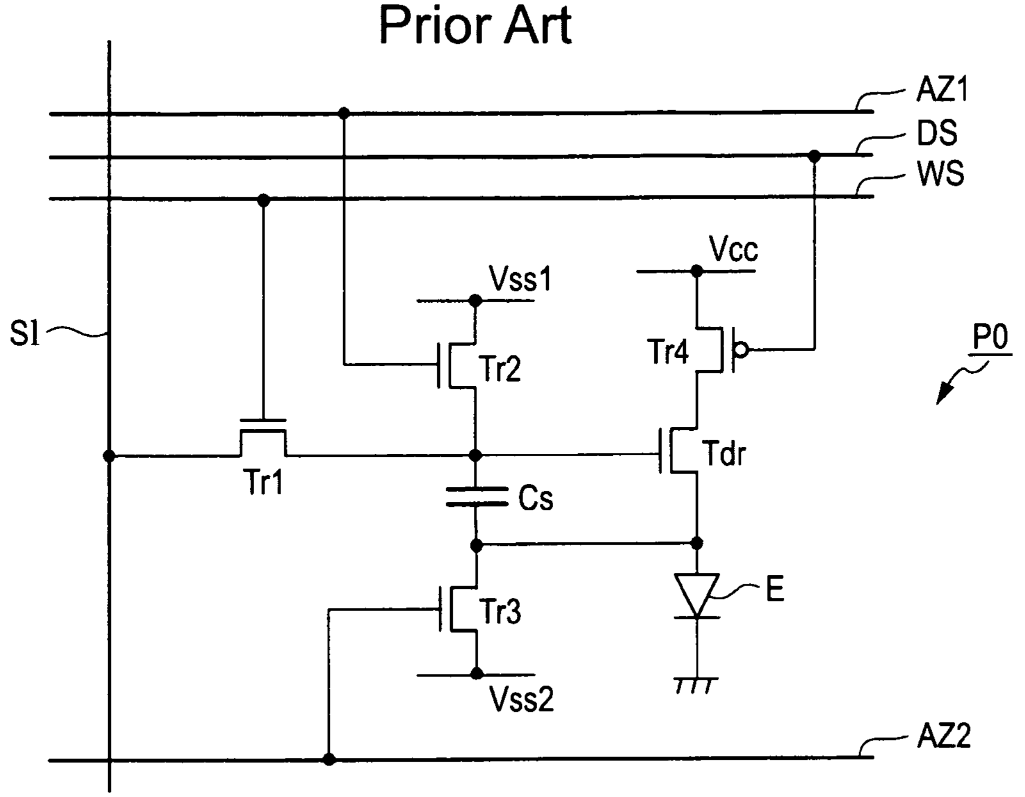
FIG. 21 Prior Art
FIG. 21 is a circuit diagram illustrating a pixel circuit in a light emitting apparatus in the related art.

In addition, in the embodiment, since the first feed line 20 corresponding to the adjacent row as viewed from the pixel circuit U is also used as the signal line for supplying signals used for the initialization or compensation operation of the pixel circuit U, there is also an advantage in that the number of signal lines or transistors can be reduced in comparison with the case (for example, the case shown in FIG. 21) where the signal lines for supplying the signals used for the initialization or compensation operation are separately provided).

As described above, according to the embodiment, there is an advantage in that it is possible to simplify the configuration for performing the initialization or compensation operation and to secure a sufficient time period for writing the data voltage VX.

A-2: Entire Configuration of Second Driving Circuit 34

Figure 9:
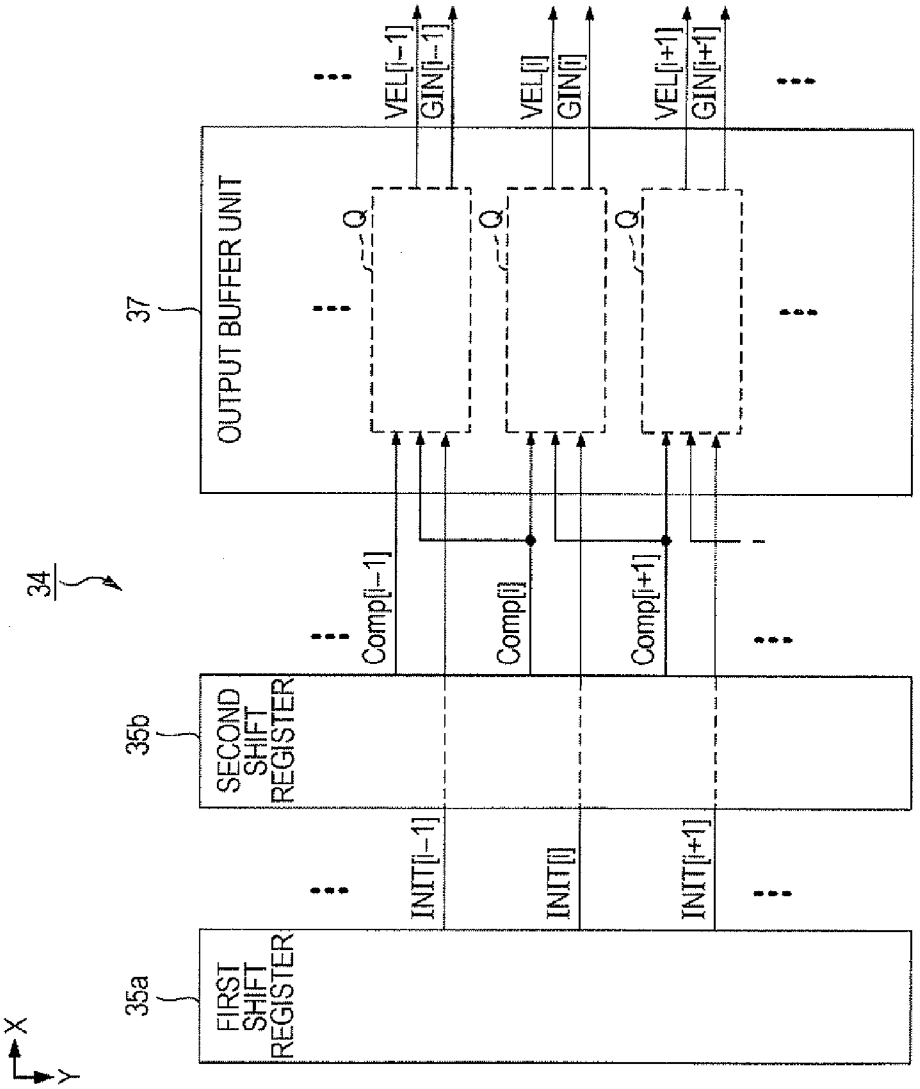
FIG. 9 is a schematic block diagram illustrating a configuration of a second driving circuit.

FIG. 9 is a schematic block diagram illustrating a configuration of a second driving circuit 34. As shown in FIG. 9, the second driving circuit 34 includes a first shift register 35*a*, a second shift register 35*b*, and an output buffer unit 37. The first shift register 35*a* generates m control signals INIT[1] to INIT[m] corresponding to the total number of the scan lines 12 (the number of rows of the pixel circuits U) by sequentially transmitting start pulse signals according to a clock signal and outputs the m control signal to the output buffer unit 37. Similarly, the second shift register 35*b* also generates m control signals Comp[1] to Comp[m] and outputs the m control signals to the output buffer unit 37.

The output buffer unit 37 includes m unit circuits Q corresponding to the total number of the scan lines 12 (the number of rows of the pixel circuits U). The control signals of the first shift register 35*a* and the second shift register 35*b* are supplied to the unit circuits Q. For example, the unit circuits Q of the i-th stage are in the state where the i-th control signal INIT[i] is supplied from the first shift register 35*a* and the i-th control signal Comp[i] and the (i+1)-th control signal Comp [i+1] are supplied from the second shift register 35*b*. Each unit circuit Q generates the power supply voltage VEL and outputs the power supply voltage VEL to the first feed line 20 corresponding to the unit circuit Q. For example, the unit circuit Q of the i-th stage is in the state where the unit circuit Q generates the power supply voltage VEL[i] and outputs the power supply voltage VEL[i] to the first feed line 20 of the i-th row. In addition, each unit circuit Q generates the control signal GIN and outputs the control signal GIN to the control line 22 corresponding to the unit circuit Q. For example, the unit circuit Q of the i-th stage is in the state where the unit circuit Q generates the control signal GIN[i] and outputs the control signal GIN[i] to the control line 22 of the i-th row.

Figure 10:
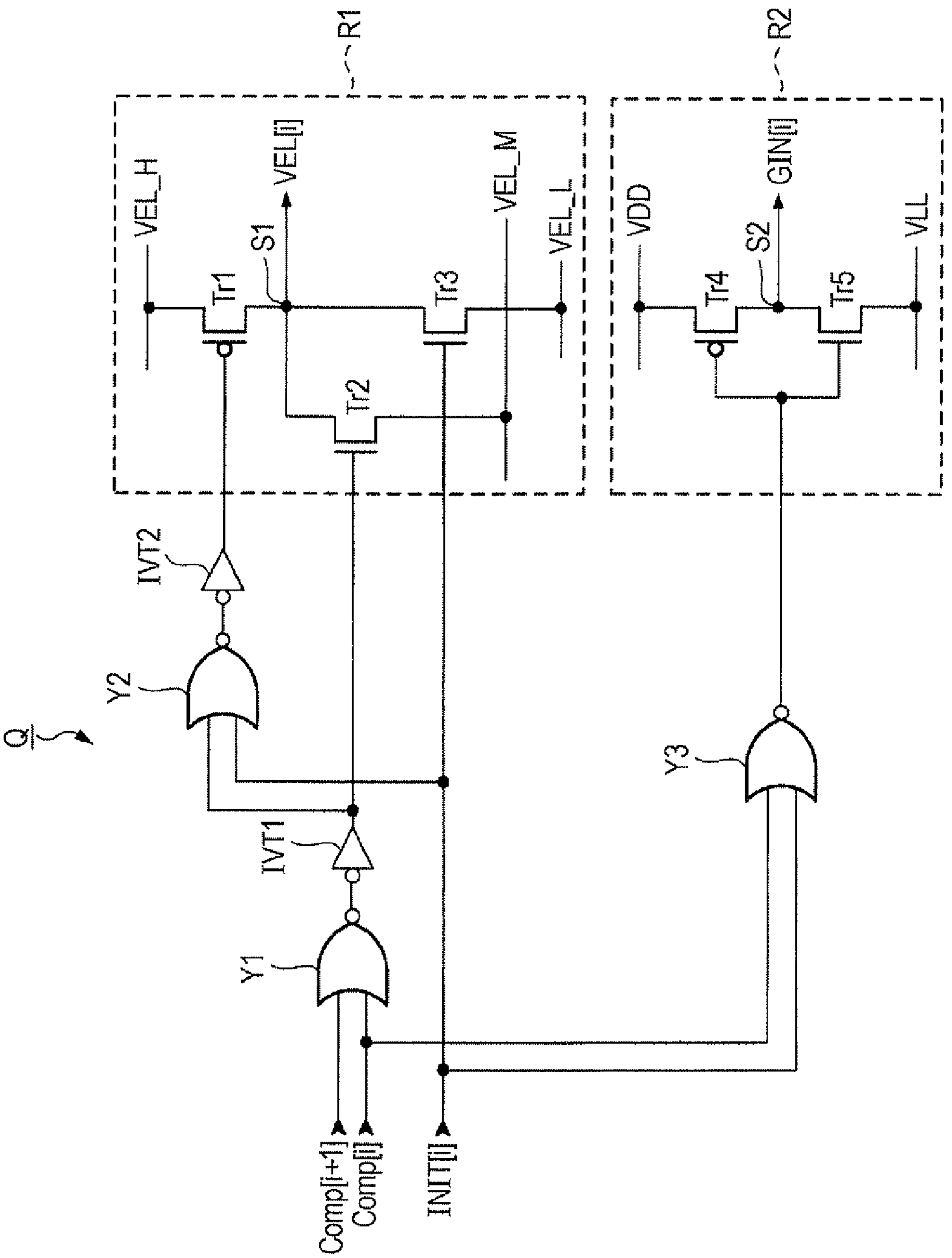
FIG. 10 is a circuit diagram illustrating a unit circuit of an output buffer unit in the second driving circuit.

FIG. 10 is a circuit diagram illustrating a unit circuit Q. In FIG. 10, only an i-th stage unit circuit Q is representatively illustrated. As shown in FIG. 10, the unit circuit Q includes NOR circuits Y1 to Y3, inverters IVT1 and IVT2, a first circuit R1, and a second circuit R2.

The first circuit R1 includes a P channel type transistor Tr1 and N channel type transistors Tr2 and Tr3. In the first circuit R1, the output terminal S1 is connected to the first feed line 20 of the i-th row. The output voltage of the output terminal 51 is the power supply voltage VEL[i] generated by the unit circuit Q. The output voltage of the output terminal 51 is set to one of the first voltage VEL_L, the second voltage VEl_M, and the third voltage VEL_H according to the control signals INIT[i], Comp[i], and Comp[i+1] input to the unit circuit Q.

The second circuit R2 includes a P channel type transistor Tr4 and a N channel type transistor Try. In the second circuit R2, the output terminal 52 is connected to the control line 22 of the i-th row. The output voltage of the output terminal 52 is the control signal GIN[i] generated by the unit circuit Q. The output voltage of the output terminal S2 is set to one of the voltage VDD (high level) and the voltage VLL (low level) lower than the voltage VDD according to the control signals INIT[i], Comp[i], and Comp[i+1] input to the unit circuit Q.

Figure 11:
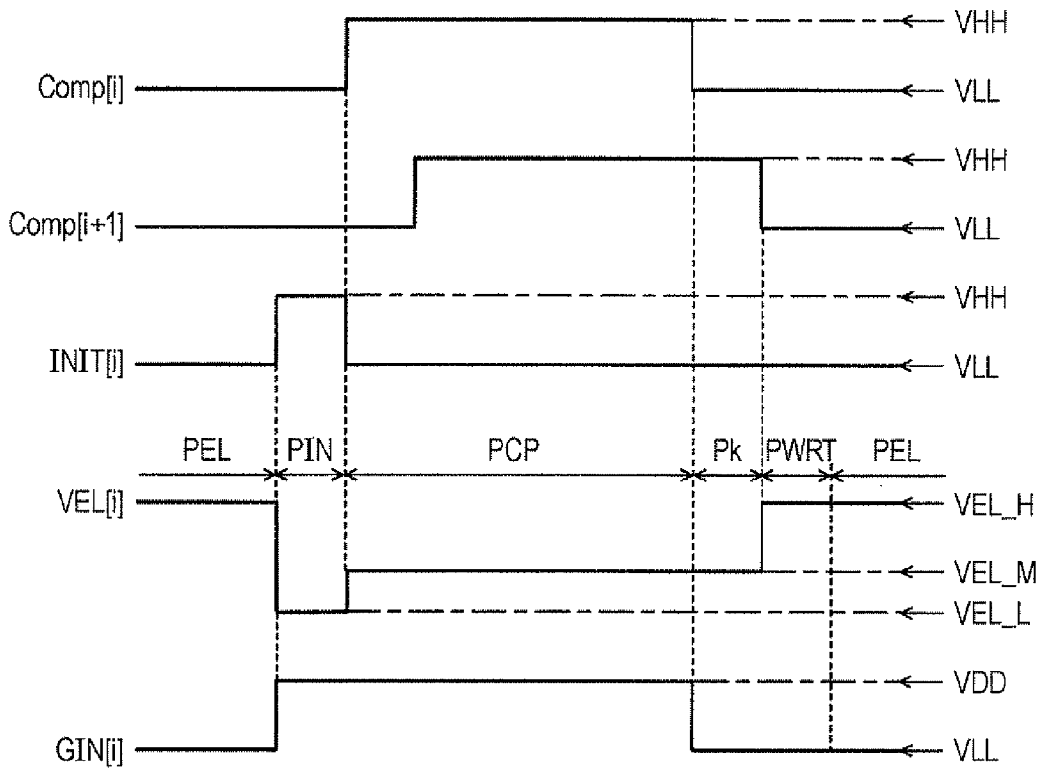
FIG. 11 is a detailed diagram illustrating waveforms of signals used to drive the unit circuit.

FIG. 11 is a detailed diagram illustrating waveforms of control signals INIT[i], Comp[i], and Comp [i+1] input to the i-th stage unit circuit Q and waveforms of a power supply voltage VEL[i] and a control signal GIN[i] generated in the i-th stage unit circuit Q. The high level voltage of each of the control signals INIT[i], Comp[i], and Comp[i+1] is set to VHH, and the low level voltage thereof is set to VLL. The voltage VHH is set to a voltage that is higher than the first voltage VEL_L, the second voltage VEl_M, the third voltage VEL_H, and the voltage VDD. In addition, the voltage VLL is set to a voltage that is lower than the first voltage VEL_L, the second voltage VEl_M, the third voltage VEL_H, and the voltage VDD.

In the embodiment, as described with reference to FIG. 2, the waveforms of the control signals INIT[i], Comp[i], and Comp[i+1] are set to be in the state where, in the initialization period PIN before the writing period PWRT (the i-th horizontal scan time period H[i]) in which the i-th scan line 12 is selected, the power supply voltage VEL[i] is the first voltage VEL_L and the control signal GIN[i] is at the high level; in the compensation period PCP, the power supply voltage VEL [i] is the second voltage VEL_M and the control signal GIN[i] is at the high level; in the storing period PK, the power supply voltage VEL[i] is the second voltage VEL_M and the control signal GIN[i] is at the low level; and in the writing period PWRT and the light emitting period PEL, the power supply voltage VEL[i] is the third voltage VEL_H and the control signal GIN[i] is at the low level.

B: Second Embodiment

B-1: Principle of Driving

Figure 12:
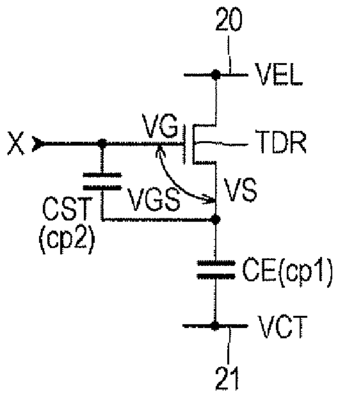
FIG. 12 is a circuit diagram for explaining a principle of driving of a pixel circuit according to a second embodiment.

A second embodiment is different from the aforementioned first embodiment in that the data voltages VX[1] to VX[n] output from the data line driving circuit 36 to the data lines 14 are varied with the one horizontal scan time period H as a period as time elapses. Now, a principle used for driving pixel circuits according to the second embodiment is described before the detailed description of the embodiment. As shown in FIG. 12, a circuit where an N channel type driving transistor TDR and a capacitance CE (capacitance value cp1) are disposed in series in a path connecting a first feed line 20 and a second feed line 21 is considered.

The voltage VEL is supplied to the first feed line 20, and the voltage VCT (VCT<VEL) is supplied to the second feed line 21. The drain of the driving transistor TDR is connected to the first feed line 20, and the capacitance CE is interposed between the source of the driving transistor TDR and the second feed line 21. A capacitance device CST (capacitance value cp2) is interposed between the gate and the source of the driving transistor TDR. Therefore, a differential voltage VGS (VGS=VG−VS) between the voltage VG of the gate of the driving transistor TDR and the voltage VS of the source thereof is applied across the capacitance device CST.

Figure 13:
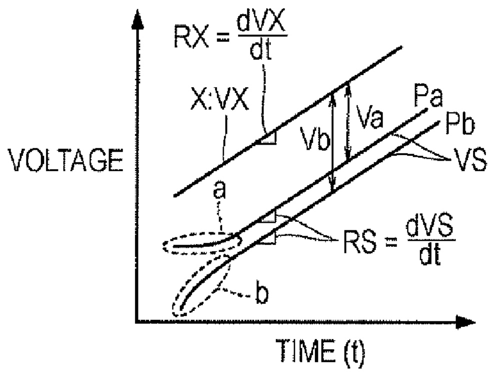
FIG. 13 is a graph for explaining the principle of the driving of the pixel circuit.

A driving signal X is supplied to a gate of the driving transistor TDR. The voltage VX of the driving signal X is changed according to a time as shown in FIG. 13. In FIG. 13, a case where the voltage VX is linearly increased with a predetermined time rate of change RX (RX=dVX/dt) is exemplified. In addition, the case where the electrical characteristic (for example, the mobility or the threshold voltage) of the driving transistor TDR is a characteristic Pa, the case where the electrical characteristic is a characteristic Pb, and the time changes in the source voltage VS are illustrated in FIG. 13.

The gate voltage VG (voltage VX) of the driving transistor TDR is increased due to the supply of the driving signal X, so that the gate-source voltage VGS of the driving transistor TDR is higher than the threshold voltage VTH of the driving transistor TDR. In this case, the current IDS is flown between the drain and the source of the driving transistor TDR. The current IDS is expressed by the following Equation (1). In Equation (1), μ denotes a mobility of the driving transistor TDR. In addition, W/L denotes a ratio of a channel width W to a channel length L of the driving transistor TDR, and Cox denotes a capacitance value per unit area of a gate insulating layer of the driving transistor TDR.

$$IDS=\tfrac{1}{2}\cdot\mu\cdot W/L\cdot Cox\cdot(VGS-VTH)^2 \quad (1)$$

On the other hand, if the current IDS is flown to the driving transistor TDR, the capacitance CE and the capacitance device CST are charged with charges. Therefore, as shown in FIG. 13, the source voltage VS of the driving transistor TDR is changed with the time rate of change RS (RS=dVS/dt) as time elapses. The current IDS and the source voltage VS of the driving transistor TDR satisfy the following Equation (2).

$$IDS=dQ/dt=cp2\cdot(dVS/dt-dVX/dt)+cp1\cdot dVS/dt \quad (2)$$

As shown in the portion a of FIG. 13, in the case where the time rate of change RS of the source voltage VS of the driving transistor TDR (that is, a gradient of the voltage VS with respect to the time t) is lower than the time rate of change RX of the voltage VX of the driving signal X, the gate-source voltage VGS of the driving transistor TDR is increased as time elapses. As expressed by Equation (1), if the voltage VGS is increased, the current IDS is increased. In addition, as understood from Equation (2), if the current IDS is increased, the time rate of change RS is also increased. In other words, if the time rate of change RS is lower than the time rate of change RX, the time rate of change RS is increased.

On the other hand, as shown in the portion b of FIG. 13, in the case where the time rate of change RX of the voltage VX of the driving signal X is lower than the time rate of change RS of the source voltage VS, since the gate-source voltage VGS is decreased as time elapses, as understood from Equation (1), the current IDS is decreased. If the current IDS is decreased, the time rate of change RS is decreased. In other words, if the time rate of change RS is higher than the time rate of change RX, the time rate of change RS is decreased.

In this manner, the time rate of change RS of the source voltage VS of the driving transistor TDR approaches the time rate of change RX of the voltage VX of the driving signal X as time elapses and finally becomes the time rate of change RX irrespective of the characteristic of the driving transistor TDR (that is, irrespective of any of the characteristics Pa and characteristic Pb). The state (hereinafter, referred to as an “equilibrium state”) where the time rate of change RS is coincident with the time rate of change RX can also be expressed as a state where an increase in the voltage VGS caused by the increase in the voltage VX of the driving signal X is cancelled by a decrease in the voltage VGS caused by the charging due to the current IDS.

In the equilibrium state, since the time rate of change RS and the time rate of change RX are coincident with each other (RS=dVS/dt=RX=dVX/dt), Equation (2) is modified as the following Equation (3). In other words, the current IDS flowing the driving transistor TDR is in proportion to the time rate of change RX of the voltage VX of the driving signal X. In addition, as described above, the current IDS is determined according to only the capacitance value cp1 of the capacitance CE and the time rate of change RX of the voltage VX without depending on the mobility μ or the threshold voltage VTH of the driving transistor TDR.

$$IDS=cp2\cdot(dVS/dt-dVX/dt)+cp1\cdot dVS/dt=cp2\cdot(dVX/dt-dVX/dt)+cp1\cdot dVX/dt=cp1\cdot RX \quad (3)$$

The gate-source voltage VGS of the driving transistor TDR is automatically set according to the mobility μ or the threshold voltage VTH so that the gate-source voltage VGS becomes the voltage which is provided so as for the current IDS of Equation (3) independent of the mobility μ or the threshold voltage VTH to be flown to the driving transistor TDR (that is, the voltage VGS satisfying the relationship of Equation (1) for the current IDS of Equation (3)). For example, in the case where the characteristic of the driving transistor TDR is the characteristic Pa of FIG. 13, the voltage VGS is set to the voltage Va, and in the case where the characteristic of the driving transistor TDR is the characteristic Pb of FIG. 13, the voltage VGS is set to the voltage Vb. In the equilibrium state, in any of the cases where the characteristics are the characteristics Pa and Pb, the common current IDS according to only the capacitance value cp1 and the time rate of change RX is flown to the driving transistor TDR.

The gate-source voltage VGS set in the above method is stored in the capacitance device CST, so that the current IDS is continuously flown to the driving transistor TDR even after the supply of the driving signal X (the voltage VX) is stopped. In the embodiment described hereinafter, the current IDS is used as the current IDR for driving the light emitting device (hereinafter, referred to as a "driving current"). Since the current IDS does not depend on the characteristics (the mobility μ or the threshold voltage VTH) of the driving transistor TDR as described with reference to Equation (3), it is possible to compensate for the error of the driving current IDR (and the error of luminance of the light emitting device) caused by the characteristics of the driving transistor TDR. On the other hand, since the driving current IDR (current IDS) is determined according to the time rate of change RX of the voltage VX of the driving signal X, it is possible to variably set the current amount of the driving current IDR (and the luminance of the light emitting device) by controlling the time rate of change RX of the voltage VX of the driving signal X.

B-2: Configuration and Operations of Light Emitting Apparatus

Figure 14:
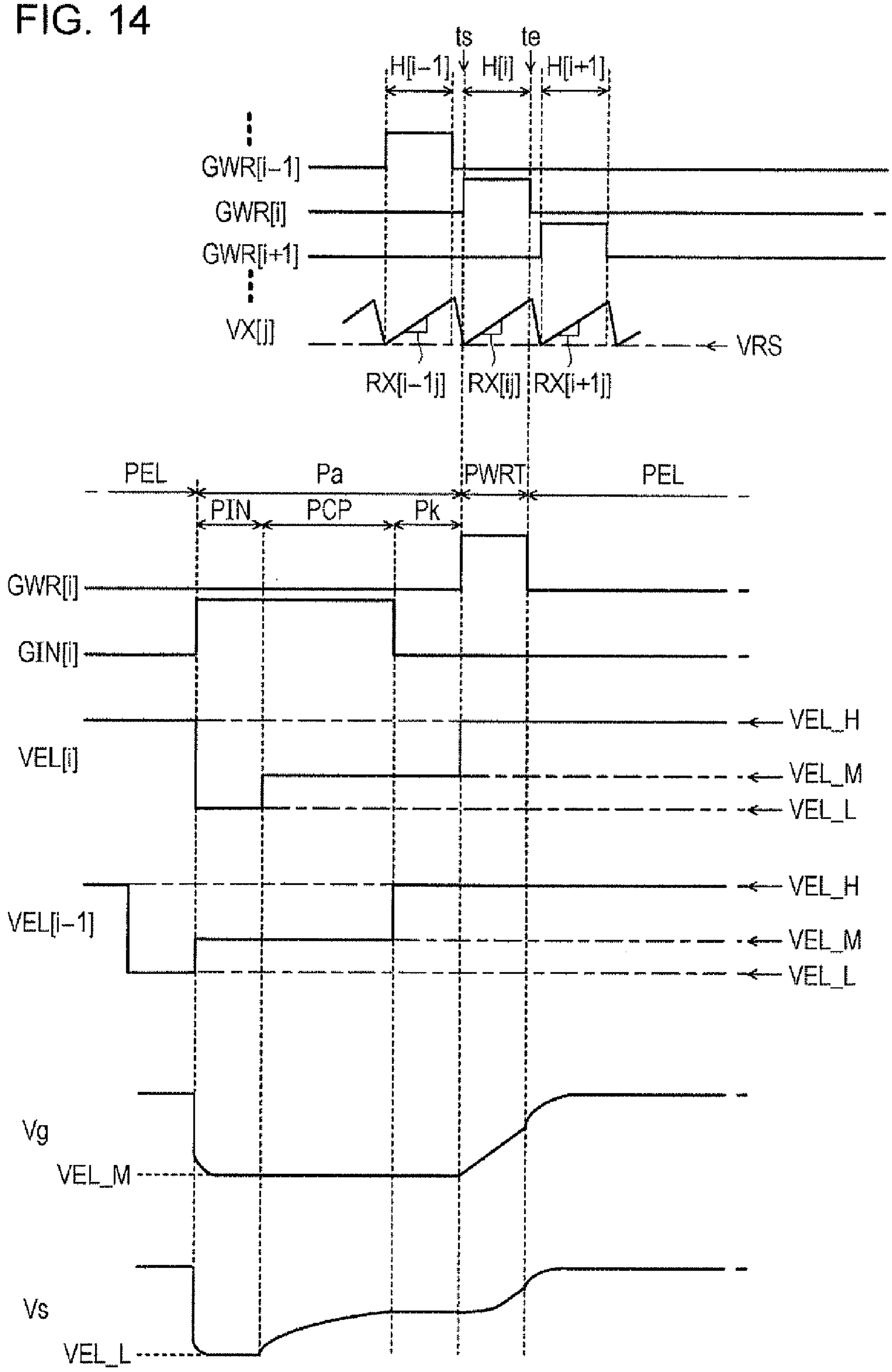
FIG. 14 is a timing chart illustrating operations of a light emitting apparatus.

Since the basic configuration of the light emitting apparatus 100 according to the second embodiment is the same as that of the aforementioned first embodiment, redundant description is omitted. As described above, in the second embodiment, the data line driving circuit 36 generates the data voltages VX[1] to VX[m], which are varied with the horizontal scan time period H as a period as time elapses, and outputs the data voltages VX[1] to VX [m] to the data lines 14. For example, if the j-th data line 14 is considered, as shown in FIG. 14, the data line driving circuit 36 generates the data voltage VX[j], which is varied with the horizontal scan time period H as a period as time elapses, and outputs the data voltage VX[j] to the j-th signal line 14. The data voltage VX[j] is set to the reference voltage VRS at the start point is of each of the horizontal scan time periods H (H[1] to H[m]), and the data voltage VX[j] is Linearly increased with the time rate of change RX (RX=dVX/dt) from the start point is to the end point to of each of the horizontal scan time periods H. In other words, the data voltage VX[j] is a voltage signal having a ramp waveform (sawtooth waveform) with the horizontal scan time period H as a period.

In the writing period PWRT (the i-th horizontal scan time period H[i]) in which the scan lines 12 of the i-th row are selected, the time rate of change RX[i,j] of the data voltage VX[j] supplied to the j-th data line 14 is variably set according to the designated gradation of the j-th pixel circuit U of the i-th row. More specifically, as the designated gradation of the pixel circuit U becomes higher, the time rate of change RX[i, j] of the data voltage VX[j] is set to a higher value. In other words, as the designated gradation of the pixel circuit U increases, the gradient of the data voltage VX[j] with respect to the time axis increases. The same description is made on the data voltages VX output to the other data lines 14.

Next, operations of the pixel circuit U are described. Hereinafter, the detailed operations of the j-th pixel circuit U of the i-th row in the writing period PWRT is described. Since the operations in the other periods are the same as those of the aforementioned first embodiment, the detailed description is omitted. As shown in FIG. 14, if the writing period PWRT starts, the first driving circuit 32 sets the scanning signal GWR[i] to the high level, and the second driving circuit 34 sets the power supply voltage VEL[i], which is output to the first feed line 20 of the i-th row, to the third voltage VEL_H. In addition, as shown in FIG. 7, since the selection transistor TS is transitioned into the ON state, the gate of the driving transistor TDR is electrically conducted to the data line 14. Accordingly, the gate of the driving transistor TDR is supplied with the data voltage VX[j], so that the gate voltage VG of the driving transistor TDR is increased with the time rate of change RX[i,j] according to the designated gradation of the pixel circuit U as time elapses as shown in FIG. 14. In addition, the current IDS according to the gate voltage VG is flown between the drain and the source of the driving transistor TDR, so that the source voltage VS is increased as time elapses. If the driving transistor TDR reaches the equilibrium state where the time rate of change RS (RS=dVS/dt) of the source voltage VS is coincident with the time rate of change RX[i,j] of the data voltage VX[j], the current IDS, which depends only the capacitance value cp1 of the capacitance CE accompanied with the light emitting device E and the time rate of change RX[i,j], is flown to the driving transistor TDR up to the end point of the writing period PWRT.

If the scanning signal GWR[i] is transitioned into the low level at the end point of the writing period PWRT, the selection transistor TS is changed into the OFF state, so that the supply of the data voltage VX[j] to the gate of the driving transistor TDR is stopped. The voltage VSET corresponding to the current IDS flowing the driving transistor TDR at the time of stopping the supply of the data voltage VX[j] is stored in the capacitance device CST. The voltage VSET is the gate-source voltage VGS which is provided to flow the current IDS of Equation (3) determined by the capacitance value cp1 of the capacitance CE and the time rate of change RX[i,j] to the driving transistor TDR, and the voltage VSET is automatically set according to the characteristics such as the mobility μ or the threshold voltage VTH of the driving transistor TDR (refer to "B-1: Principle of Driving"). In other words, the voltage VSET across the capacitance device CST is set to a value reflecting the characteristics of the data voltage VX[j] and the driving transistor TDR.

As described above, the current amount of the driving current IDR supplied to the light emitting device E is determined according to the time rate of change RX of the data voltage VX at the end point te of the writing period PWRT. In the embodiment, the data line driving circuit 36 changes the data voltage VX as time elapses so that the time rate of change RX of the data voltage VX at the end point te of the writing period PWRT (at the time of stop of the supply of the data voltage VX to the gate of the driving transistor TDR) is the time rate of change RX corresponding to the designated gradation of the pixel circuit U.

In the embodiment, since the voltage VSET across the capacitance device CST is set so that the current IDS according to the time rate of change RX[i,j] of the data voltage VX[j] (the current independent of the mobility μ or the threshold voltage VTH of the driving transistor TDR) is flown to the driving transistor TDR, it is possible to suppress the error of the driving current IDR (in addition, the error of the luminance of the light emitting device E) caused by the characteristics (the mobility μ or the threshold voltage VTH) of the driving transistor TDR irrespective of the designated gradation of the pixel circuit U. Therefore, there is an advantage in that an irregularity of the gradation of the image displayed, for example, on the device unit 10 is suppressed.

In addition, similarly to the aforementioned first embodiment, in the embodiment, it is possible to simplify a configuration for performing an initialization or compensation operation and to secure a sufficient time period for writing the data voltage VX. Therefore, in each of the horizontal scan time periods H, since it is possible to secure a sufficient time length taken to reach the equilibrium state where the time rate of change RS (RS=dVS/dt) of the source voltage VS of the driving transistor TDR is coincident with the time rate of change RX of the data voltage VX, there is an advantage in that the driving transistor TDR can be allowed to securely reach the equilibrium state.

C: Third Embodiment

Figure 15:
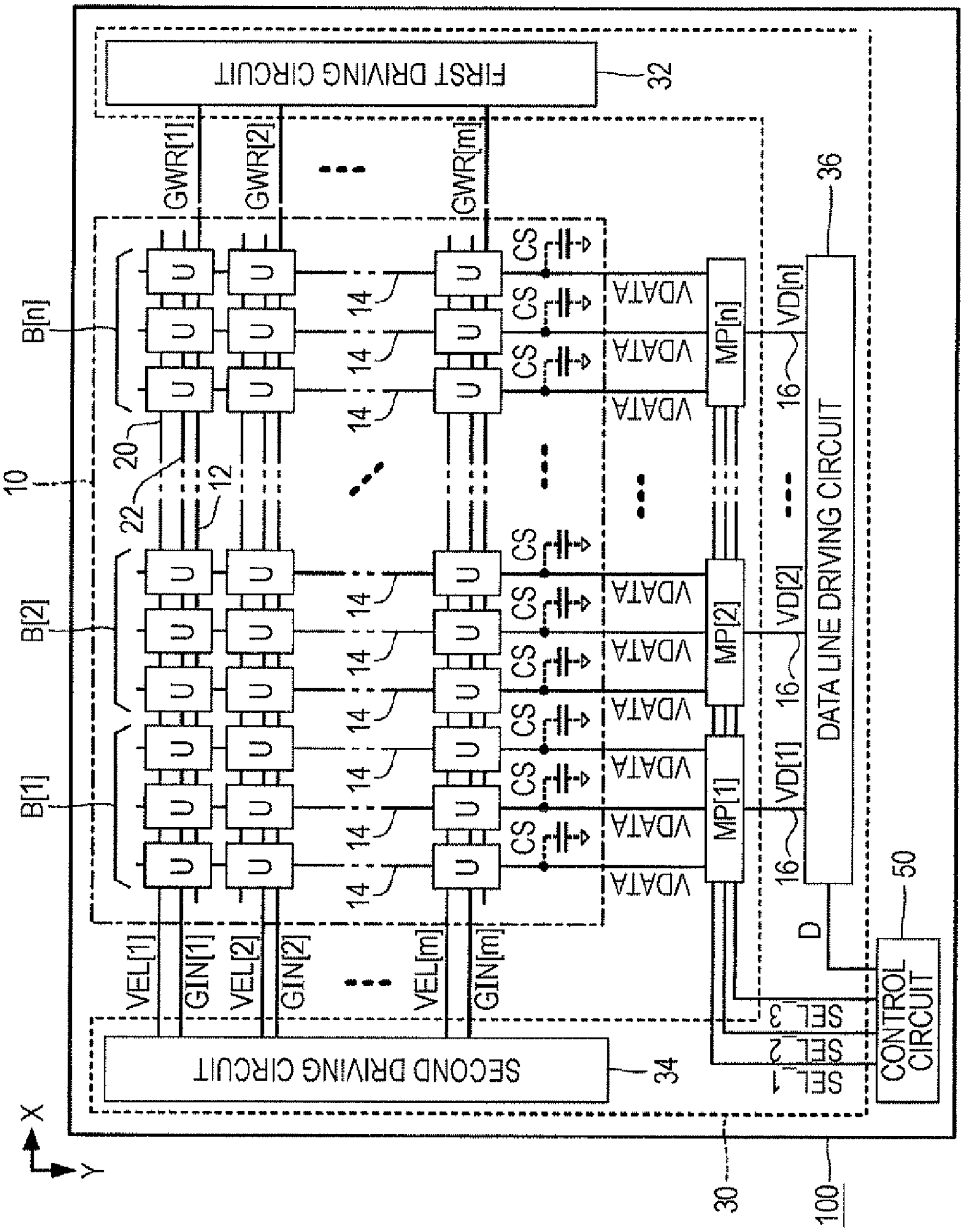
FIG. 15 is a block diagram illustrating a light emitting apparatus according to a third embodiment.

FIG. 15 is a block diagram illustrating a light emitting apparatus 100 according to a third embodiment. In the third embodiment, 3*n* data lines 14 are grouped into n blocks B (B[1] to B[n]) in units of three adjacent lines. Herein, m red pixel circuits U arrayed in the Y direction are connected to the first data line 14 of each of the blocks B[1] to B[n]. Similarly, m green pixel circuits U are connected to the second data line 14 of each of the blocks B[1] to B[n], and m blue pixel circuits U are connected to the third data line 14. In other words, the m pixel circuits U arrayed in the Y direction correspond to the same color (in a stripe array). In addition, the configuration of the array of each of the display colors can be arbitrarily changed.

In addition, as shown in FIG. 15, the light emitting apparatus 100 according to the embodiment further includes n image signal lines 16, which are disposed in one-to-one correspondence with the n blocks B[1] to B[n], and n selection units MP (MP[1] to MP[n]), which are disposed in one-to-one correspondence with the n blocks B[1] to B[n] and switches the conduction and the non-conduction between the data lines 14 included in the corresponding block B and the image signal lines 16 corresponding to the block B. In addition, since the configurations of the pixel circuits U, the first driving circuit 32, and the second driving circuit 34 are the same as those of the aforementioned first embodiment, the detailed description thereof is omitted.

The control circuit 50 shown in FIG. 15 outputs signals of defining the operations of the light emitting apparatus 100 to the driving circuit 30 or the selection units MP[1] to MP[n]. In the embodiment, the control circuit 50 outputs selection signals SEL_1 to SEL_3 of defining the operations of the selection units MP[1] to MP [n] to the selection units MP[1] to MP[n]. In addition, the control circuit 50 outputs gradation data D representing the designated gradations of the pixel circuits U and control signals (not shown) such as clock signals to the data line driving circuit 36. In addition, the control circuit 50 also outputs the control signals (not shown) such as clock signals to the first driving circuit 32 or the second driving circuit 34.

The data line driving circuit 36 generates n phase gradation signals VD[1] to VD[n] based on the gradation data D of the pixel circuits U, which are output by the control circuit 50, and outputs the gradation signals VD[1] to VD[n] to the image signal lines 16 in parallel. For example, the gradation signal VD[j] output to the image signal lines 16 corresponding to the j-th block B[j] is a time-division output voltage signal of a data voltage VDATA according to the gradation data D of each of three pixel circuits U corresponding to the intersections of the data lines 14 of the three columns included in the block B[j] and the scan line 12 selected by the first driving circuit 32.

Figure 16:
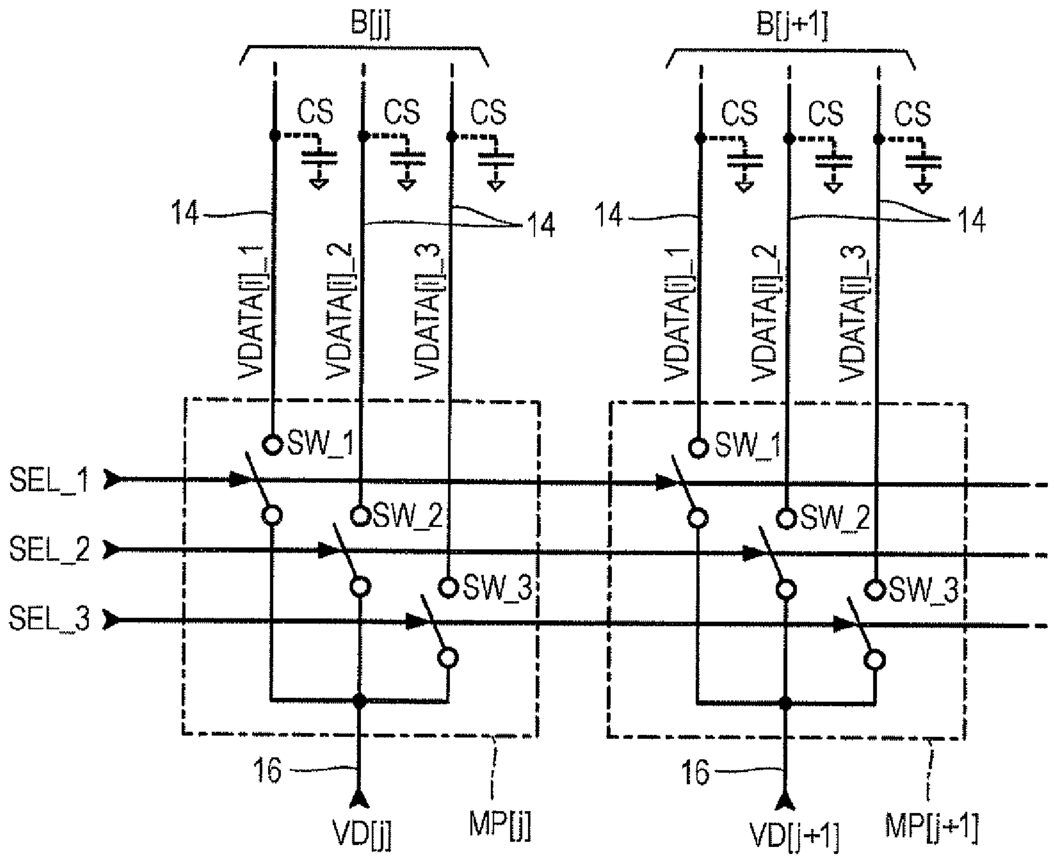
FIG. 16 is a circuit diagram illustrating a selection unit.

Each of the selection units MP functions as a means for distributing the gradation signals VD, which are output to the image signal lines 16 corresponding to the block B, to the three data lines 14 included in the block B corresponding to the selection unit MP. FIG. 16 is a circuit diagram illustrating the selection unit MP. In FIG. 16, only two selection units MP (MP[j] and MP[j+1]) are representatively illustrated. The selection unit MP[j] includes three switches SW (SW_1 to SW_3) corresponding to the number of the data lines 14 in the block B[j]. The switch SW_k (k=1 to 3) of the selection unit MP[j] is interposed between the k-th data line 14 and the j-th image signal line 16 in the block B[j] to control the electrical connection (conduction/non-conduction) therebetweeen. The control circuit 50 commonly supplies three-series selection signals SEL_1 to SEL_3 to the n selection units MP[1] to MP[n]. The selection signal SEL_k (k=1 to 3) is supplied to the switch SW_k of each of the selection units MP[1] to MP[n] to control on or off of the switch.

Figure 17:
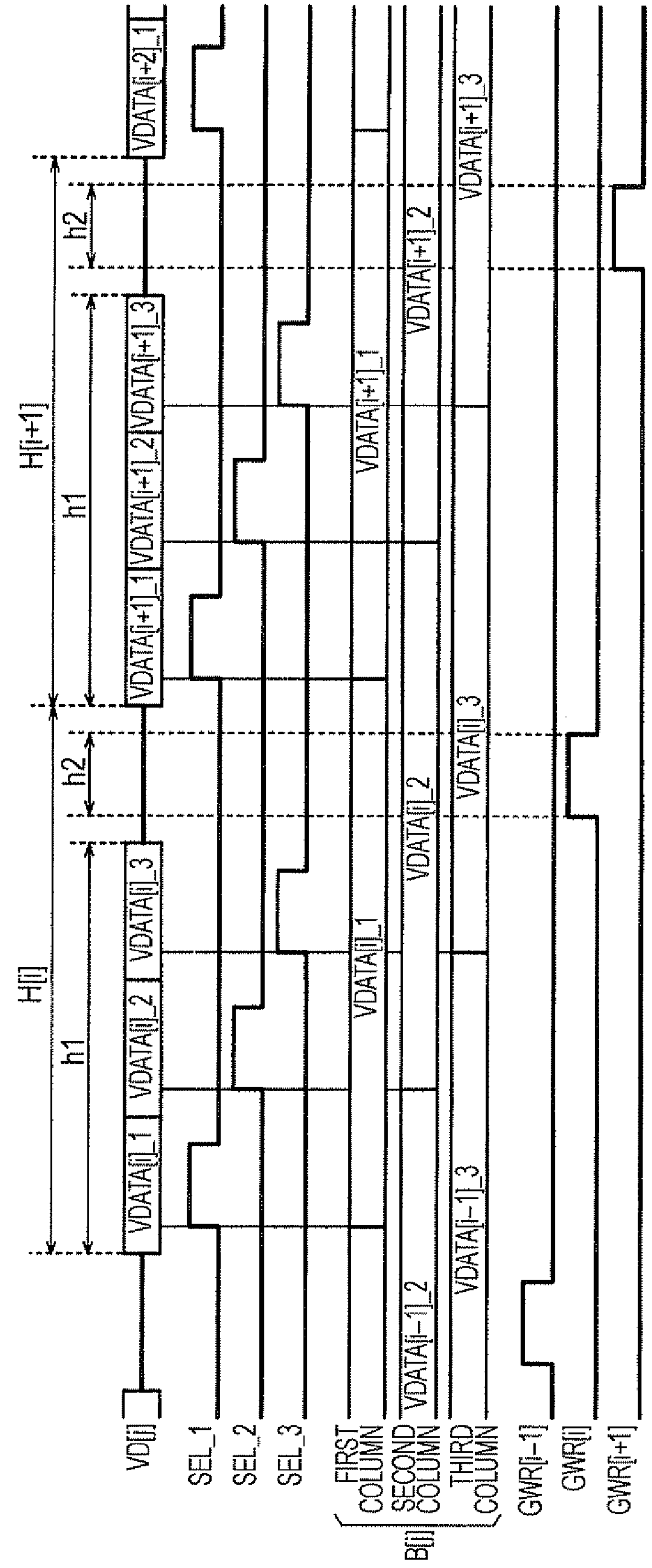
FIG. 17 is a timing chart illustrating operations of a light emitting apparatus.

FIG. 17 is a timing chart illustrating operations of the light emitting apparatus 100 according to the embodiment. As shown in FIG. 17, each of the horizontal scan time periods H[1] to H[m] includes a first time period h1 and a second time period h2. The second time period h2 is a time period after the elapse of the first time period h1. In the first time period h1 of each horizontal scan time period H, the data line driving circuit 36 outputs to each image signal line 16 the gradation signal VD which time-divisionally designates the designated gradation of the pixel circuit U corresponding to each intersection between each data line 14 included in the block B corresponding to the image signal line 16 and each scan line 12 selected in the horizontal scan time period H. In addition, each of the selection units MP[1] to MP[n] time-divisionally selects each data line 14 included in the block B corresponding to the selection unit MP and allows the data line 14 to be conducted to the image signal line 16 corresponding to the block B. In the second time period h2 of each horizontal scan time period H, the first driving circuit 32 selects the scan line 12 which is to be selected in the horizontal scan time period H. In addition, each of the selection units MP[1] to MP[n] allows each data line 14 included in the block B corresponding to the selection unit not to be conduct to the image signal line 16 corresponding to the block B. Now, the signals used to drive the light emitting apparatus 100 according to the embodiment are described with reference to FIG. 17.

As shown in FIG. 17, for example, the gradation signal VD[j] output to the j-th image signal line 16 is sequentially set to the data voltages VDATA (VDATA[i]_1 to VDATA[1]_3) corresponding to the gradation data D of each of the three pixel circuits U at the intersections of the scan line 12, which is to be selected in the horizontal scan time period H, and the data lines 14 included in the block B[j] in the first time period h1 of each of the horizontal scan time periods H (H[1] to H[m]). The same description is made on the gradation signals VD output to the other image signal lines 16.

As shown in FIG. 17, the selection signals SEL_1 to SEL_3 are sequentially set to the active level (high level) in the first time period h1 of each horizontal scan time period H. If the j-th block B[j] is considered, the selection signal SEL_k (k=1 to 3) is set to the high level in the time period in which the image signal VD[j] output to the j-th image signal line 16 corresponding to the block B[j] becomes the gradation voltage VDATA[i]_k of the k-th pixel circuit U in the block B[j] among the first time period h1 of each horizontal scan time period H.

If the selection signal SEL_k is transitioned into the active level in the first time period h1 within the horizontal scan time period H[i], the data voltage VDATA[i]_k set as the image signal VD[j] is supplied to the k-th data line 14 of the block B[j] through the switch SW_k of the selection unit MID[j]. With respect to each of the data lines 14, since the capacitance CS is accompanied as shown in FIG. 15, the data voltage VDATA[i]_k supplied to the k-th data line 14 of the block B[j] is stored in the data line 14 until the selection signal SEL_k is set to the high level again in the first time period h1 of the following (i+1)-th horizontal scan time period H[i+1]. In this manner, in the first time period h1 of each horizontal scan time period H, the voltage of each data line 14 is set to the data voltage VDATA corresponding to the gradation data D of the pixel circuit U at the intersection of the scan line 12 selected in the horizontal scan time period H and the data line 14.

As shown in FIG. 17, the scanning signals GWR[1] to GWR[m] are sequentially set to the active level (high level) in the second time period h2 of each of the horizontal scan time periods H[1] to H[m]. For example, in the second time period h2 of the horizontal scan time period H[i], the scanning signal GWR[i] supplied to the scan lines 12 of the i-th row is set to the high level, so that all the selection transistors TS of the n pixel circuits U included in the i-th row are transitioned into the ON state. Accordingly, since the gate of the driving transistor TDR in each pixel circuit U is electrically conducted to the data line 14 corresponding to the pixel circuit U, the data voltage VDATA according to the designated gradation D of the pixel circuit U is supplied to the gate of the driving transistor TDR. At this time, since the selection signals SEL_1 to SEL_3 are set to the low levels, each data line 14 included in each block B is not allowed to be conducted to the image signal line 16 corresponding to the block B. However, the voltage of each data line 14 is stored as the data voltage VDATA set in the first time period h1 due to the capacitance CS accompanied with the data line 14.

Similarly to the aforementioned first embodiment, in the embodiment, the first feed line 20 corresponding to the adjacent row as viewed from the pixel circuit U is also used as the signal line for supplying signals used for the initialization or compensation operation of the pixel circuit U. Therefore, similarly to the embodiment shown in FIG. 22, the signals used for the initialization or compensation operation of each pixel circuit U is not supplied to each of the data lines 14. In other words, since a sufficient time period for writing the data voltage in the one horizontal scan time period H can be secured and only the data voltage is output from each of the data lines 14, the data voltage VDATA[i]_k supplied to the k-th data line 14 of the block B[j], for example, in the first time period h1 of the i-th horizontal scan time period H[i] is stored in the data line 14 until the selection signal SEL_k is set to the high level again in the following (i+1)-th horizontal scan time period H[i+1]. By using this configuration, the embodiment employs a demultiplexer method in which the data voltages VDATA time-divisionally supplied to the image signal lines 16 are distributed to the data lines 14 included in the block B corresponding to the image signal lines 16 by the selection units MP corresponding to the image signal lines 16. Therefore, the total number of output wire lines (image signal lines 16) of the data line driving circuit 36 is smaller than the total number of the data lines 14. Therefore, according to the embodiment, there is an advantage in that the number of outputs of the data line driving circuit 36 can be reduced.

D: Modified Examples

The invention is not limited to the aforementioned embodiments. For example, the following modifications are available. In addition, two or more of the following modified examples may be combined.

1. Modified Example 1

The transistors (driving transistor TDR, selection transistor TS, and reset transistor TRES) constituting the pixel circuits U have arbitrary conductive types. For example, a configuration where the driving transistor TDR is of a P channel type may be employed. In the case where the P channel type driving transistor TDR is employed, the relationship of the voltages (heights of the voltages) is inverted in comparison with the case where the N channel type driving transistor TDR is employed. However, basic operations are the same as those shown in FIG. 2. Therefore, the detailed description thereof is omitted.

2. Modified Example 2

In the aforementioned second embodiment, the current amount of the driving current IDR supplied to the light emitting device E is determined according to the time rate of change RX of the data voltage VX at the end point te of the writing period PWRT. Therefore, although the configuration where the time rate of change RX of the data voltage VX at the end point te of the writing period PWRT (at the time of stop of the supply of the data voltage VX to the gate of the driving transistor TDR) among the data voltages VX is set according to the designated gradation is very suitable, the waveform (the time rate of change RX) of the data voltage VX during the writing period PWRT is not particularly limited in the invention. However, in order to allow the time rate of change RS of the source voltage VS of the driving transistor TDR to be accurately coincident with the time rate of change RX of the data voltage VX at the end point te of the writing period PWRT, a configuration where the time rate of change RX of the data voltage VX is continuously maintained at a constant value according to the designated gradation over a predetermined time period up to the end point te is very suitable.

3. Modified Example 3

In the aforementioned third embodiment, although three data lines 14 are grouped into the block B, the number of the data lines 14 included in the block B may be arbitrarily selected. In addition, the types or number of the display colors of the pixel circuits U corresponding to a plurality of the data lines 14 in the block B may be arbitrarily selected.

4. Modified Example 4

The light emitting device E may be an OLED device. In addition, the light emitting device E may be an inorganic light emitting diode or LED (Light Emitting Diode). As the essential point, all the devices of emitting light according to the supply of the electric energy (the electrical field applying or the current supplying) may be employed as the light emitting device according to the invention.

E: Application Example

Figure 18:
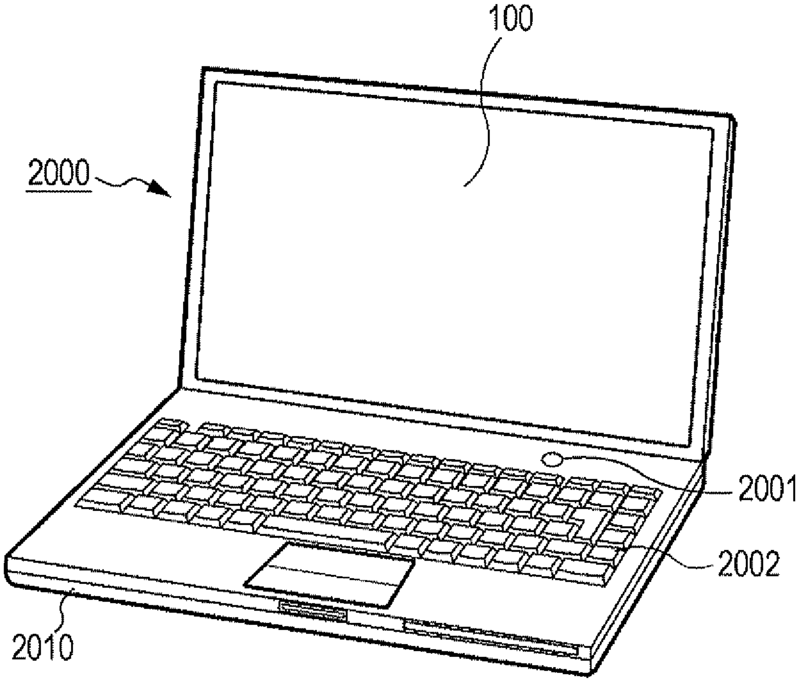
FIG. 18 is a perspective view illustrating a detailed form of an electronic apparatus according to the invention.

Next, electronic apparatuses using the light emitting apparatus according to the invention are described. FIG. 18 is a perspective view illustrating a configuration of a mobile type personal computer employing the light emitting apparatus 100 according to the aforementioned embodiments as a display apparatus. The personal computer 2000 includes a light emitting apparatus 100 as a display apparatus and a main body unit 2010. The main body unit 2010 is provided with a power supply switch 2001 and a keyboard 2002. In the light emitting apparatus 100, since the OLED device is employed as the light emitting device E, it is possible to display an easy-viewing screen with a wide viewing angle.

Figure 19:
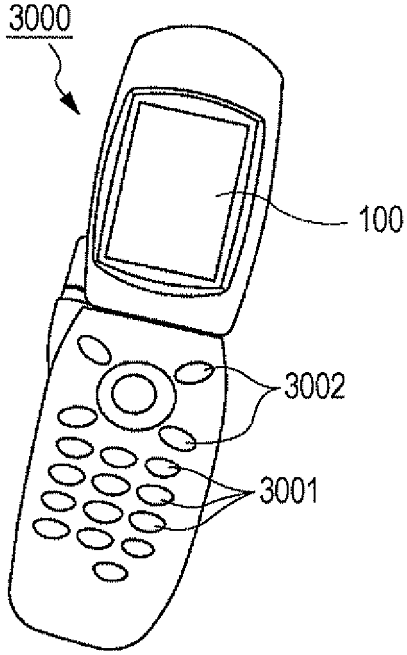
FIG. 19 is a perspective view illustrating a detailed form of an electronic apparatus according to the invention.

FIG. 19 illustrates a configuration of a mobile phone employing the light emitting apparatus 100 according to the above-described embodiments as a display apparatus. The mobile phone 3000 includes a plurality of manipulation buttons 3001, a scroll button 3002, and the light emitting apparatus 100. By manipulating the scroll button 3002, a screen displayed on the light emitting apparatus 100 is scrolled.

Figure 20:
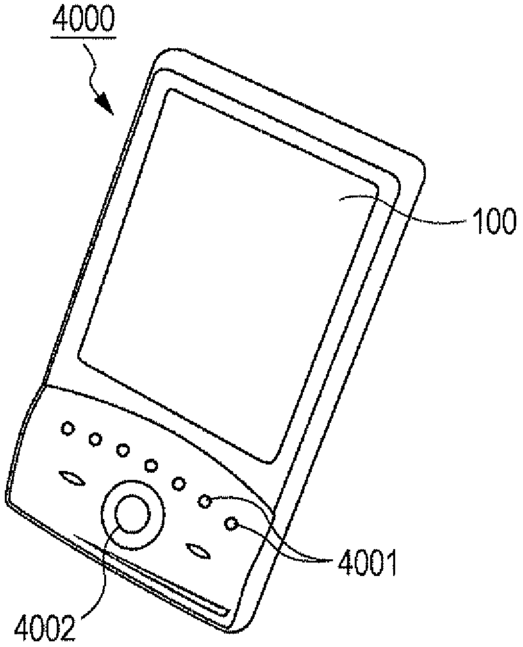
FIG. 20 is a perspective view illustrating a detailed form of an electronic apparatus according to the invention.

FIG. 20 illustrates a configuration of a mobile information terminal (PDA: Personal Digital Assistant) employing the light emitting apparatus 100 according to the aforementioned embodiment as a display apparatus. The mobile information terminal 4000 includes a plurality of manipulation buttons 4001, a power switch 4002, and the light emitting apparatus 100. By manipulating the power switch 4002, various types of information such as an address list or a schedule book are displayed on the light emitting apparatus 10.

In addition the electronic apparatus, to which the light emitting apparatus according to the invention is adapted, includes a digital camera, a television set, a video camera, a car navigation apparatus, a pager, an electronic diary, an electronic paper, a calculator, a word processor, a workstation, a television phone, a POS terminal, a printer, a scanner, a copier, a video player, an apparatus having a touch panel, and the like as well as the apparatuses shown in FIGS. 18 to 20.

What is claimed is:

1. A light emitting apparatus comprising:

a first scan line;

a second scan line;

a first feed line;

a second feed line;

a third feed line;

a fourth feed line;

a data line;

a first driving transistor having a first end electrically connected to the first feed line, a second end, and a first gate;

a first light emitting device having a first end electrically connected to the second end of the first driving transistor, and a second end connected to the second feed line;

a first capacitance device having a first end electrically connected to the first gate of the first driving transistor, and a second end electrically connected to a first source of the first driving transistor;

a first selection transistor having a first end electrically connected to the first gate of the first driving transistor, a second end electrically connected to the data line, and a second gate electrically connected to the first scan line;

a first reset transistor having a first end electrically connected a first node between the first gate of the first driving and the first end of the first selection transistor, and a second end electrically connected to the third feed line;

a second driving transistor having a first end electrically connected to the third feed line, a second end, and a third gate;

a second light emitting device having a first end electrically connected to the second end of the second driving transistor, and a second end connected to the second feed line;

a second capacitance device having a first end electrically connected to the third gate of the second driving transistor, and a second end electrically connected to a second source of the second driving transistor;

a second selection transistor having a first end electrically connected to the third gate of the second driving transistor, a second end electrically connected to the data line, and a fourth gate electrically connected to the second scan line;

a second reset transistor having a first end electrically connected to a second node between the third gate of the second driving transistor and the first end of the second selection transistor, and a second end electrically connected to the fourth feed line; and a driving circuit; wherein in a first period, the driving circuit sets the first selection transistor to an OFF state and sets the first reset transistor to an ON state, and the driving circuit sets a voltage output to the first feed line to a first voltage and sets a voltage output to the third feed line to a second voltage so that the first driving transistor is in the ON state, in a second period after the first period, the driving circuit performs a compensation operation of allowing a gate-source voltage of the first driving transistor to asymptotically approach a threshold voltage by setting the voltage output to the first line to the second voltage so that a current is flown from the first feed line to the driving transistor, in a third period after the second period, the driving circuit sets the first selection transistor to the ON state and sets the first reset transistor to the OFF state, the driving circuit outputs a first data voltage to the data line, and the driving circuit sets the voltage output to the first feed line to a third voltage so as for the current according to the data voltage to be flown to the first driving transistor so that a voltage across the first capacitance device is set to a value reflecting the data voltage and a characteristic of the first driving transistor, and in a fourth period after the third period, the driving circuit sets the first selection transistor to the OFF state, so that the source voltage of the first driving transistor is changed so that the first light emitting device emits light.

2. The light emitting apparatus according to claim 1, wherein the first, second, and third voltages are set so that the light emitting device does not emit light in the first period, the second period, and the third period.

3. The light emitting apparatus according to claim 1, wherein the driving circuit changes the first data voltage as time elapses so that a time rate of change of the first data voltage at a time of stop of the supply of the first data voltage to the first driving transistor is a time rate of change corresponding to the designated gradation.

4. The light emitting apparatus according to claim 3, wherein the voltage across the first capacitance device is set so that a current corresponding to a product of the time rate of change of the first data voltage at the time of stop of the supply of the first data voltage to the first driving transistor and a capacitance value of a capacitance accompanied with the first light emitting device is flown to the first driving transistor.

5. The light emitting apparatus according to claim 1, further comprising:

a second data line;

an image signal line;

a selection unit having an input terminal electrically connected to the image signal line, a first output terminal electrically connected to the data line, and a second output terminal electrically connected to the second data line; wherein in a fifth period before the third period, the driving circuit outputs the first data voltage to the image signal line and the selection unit outputs the first data voltage to the data line, and in a sixth period after the fifth period and before the third period, the driving circuit outputs a second data voltage to the image signal line and the selection unit outputs the second data voltage to the second data line.

6. An electronic apparatus having the light emitting apparatus according to claim 1.

7. A method of driving a light emitting apparatus including a first scan line, a second scan line, a first feed line, a second feed line, a third feed line, a data line, a first driving transistor having a first end electrically connected to the first feed line, a second end, and a first gate, a first light emitting device having a first end electrically connected to the second end of the first driving transistor and a second end connected to the second feed line, a first capacitance device having a first end electrically connected to the first gate of the first driving transistor, and a second end electrically connected to a first source of the first driving transistor, a second driving transistor having a first end electrically connected to the third feed line, a second end, and a second gate, a second light emitting device having a first end electrically connected to the second end of the second driving transistor, and a second end connected to the second feed line, and a second capacitance device having a first end electrically connected to the second gate of the second driving transistor, and a second end electrically connected to a second source of the second driving transistor, the method comprising:

in each selection period, sequentially selecting one scan lines and outputting a data voltage according to a designated gradation of the pixel circuit corresponding to the one scan line to each data line;

in a first period, setting a voltage output to the first feed line to a first voltage and setting a voltage output to the third feed line to a second voltage so that the first driving transistor is in the ON state;

in a second period after the first period, performing a compensation operation of allowing a gate-source voltage of the first driving transistor to asymptotically approach a threshold voltage by setting the voltage output to the first feed line to the second voltage, so that a current is flown from the first feed line to the first driving transistor;

in third period after the second period, selecting the first scan line and supplying a first data voltage according to a designated gradation to the first gate of the first driving transistor through the data line, and setting the first voltage output to according to the first data voltage is flown to the first driving transistor, so that a voltage across the first capacitance device is set to a value reflecting the first data voltage and a characteristic of the first driving transistor; and in a fourth period after the third period, changing the source voltage of the first driving transistor so that the first light emitting device emits light.

8. The method of driving a light emitting apparatus according to claim 7, wherein the first data voltage is allowed to be changed as time elapses so that a time rate of change of the first data voltage at a time of stop of the supply of the first data voltage to the first driving transistor is a time rate of change corresponding to the designated gradation.

9. An electronic apparatus having the light emitting apparatus according to claim 2.

10. An electronic apparatus having the light emitting apparatus according to claim 3.

11. An electronic apparatus having the light emitting apparatus according to claim 4.

12. An electronic apparatus having the light emitting apparatus according to claim 5.

* * * * *